United States Patent
Moore et al.

(10) Patent No.: US 9,555,369 B2
(45) Date of Patent: Jan. 31, 2017

(54) EMISSION CONTROL SYSTEM

(71) Applicant: SHAW ENVIRONMENTAL & INFRASTRUCTURE, INC., Baton Rouge, LA (US)

(72) Inventors: Randall P. Moore, Powell, TN (US); Kevin Jackson, Knoxville, TN (US); Stephen Baloga, Knoxville, TN (US); Berani A. C. Halley, Knoxville, TN (US); Bobby I. T. Chen, Bowling Green, TN (US); John Edel, Baton Rouge, LA (US)

(73) Assignee: SHAW ENVIRONMENTAL & INFRASTRUCTURE, INC., Baton Rouge, LA (US)

( * ) Notice: Subject to any disclaimer, the term of this patent is extended or adjusted under 35 U.S.C. 154(b) by 14 days.

(21) Appl. No.: 14/671,347

(22) Filed: Mar. 27, 2015

(65) Prior Publication Data

US 2015/0231560 A1    Aug. 20, 2015

Related U.S. Application Data

(63) Continuation of application No. 13/926,243, filed on Jun. 25, 2013, now Pat. No. 9,097,420, which is a continuation of application No. 13/364,059, filed on Feb. 1, 2012, now Pat. No. 8,580,214.

(60) Provisional application No. 61/527,949, filed on Aug. 26, 2011, provisional application No. 61/438,404, filed on Feb. 1, 2011.

(51) Int. Cl.
  *B01D 53/64* (2006.01)
  *B01D 46/00* (2006.01)

(52) U.S. Cl.
  CPC ......... *B01D 53/64* (2013.01); *B01D 2257/602* (2013.01)

(58) Field of Classification Search
  CPC ........... B01D 53/64; B01D 46/00; C10L 1/20; C10L 5/00
  USPC ............. 423/210, 215.5; 431/2; 44/620, 621
  See application file for complete search history.

(56) References Cited

U.S. PATENT DOCUMENTS

| | | | |
|---|---|---|---|
| 7,833,500 B1 * | 11/2010 | Pan | B01D 53/8665 423/210 |
| 8,580,214 B2 * | 11/2013 | Moore | B01D 53/64 423/210 |
| 8,715,599 B2 * | 5/2014 | Pollack | B01J 20/0259 252/182.32 |
| 9,097,420 B2 * | 8/2015 | Moore | B01D 53/64 |
| 2012/0285352 A1 * | 11/2012 | Senior | C10L 9/10 110/342 |

* cited by examiner

*Primary Examiner* — Timothy Vanoy
(74) *Attorney, Agent, or Firm* — Osha Liang LLP

(57) ABSTRACT

Methods of treating mercury contaminated gas comprising: introducing a hydrogen halide selected from HBr and HI into a mercury contaminated gas stream containing a quantity of particulate matter at an introduction rate sufficient to create a concentration of at least 0.1 ppmvd; wherein greater than 50% of all particulate matter in the mercury contaminated gas stream is a native particulate matter; contacting a quantity of active bromine with the native particulate matter; creating a doped particulate matter; coating a filtration media with the doped particulate matter; and passing a portion of the mercury contaminated gas stream through the doped particulate matter on the filtration media and other related methods are disclosed herein.

12 Claims, 43 Drawing Sheets

| Location | SCR | SNCR | FF/BH | ESP | DFGD | WFGD | PRB | Lignite | Bituminous | Biomass | Trona | Carbon | Steam | Electric | Size (MW) |
|---|---|---|---|---|---|---|---|---|---|---|---|---|---|---|---|
| Examples 1A-1E | X | | | X | | | X | | | | X | | | X | 340 |
| Example 2 | X | | | X | | | X | | | | | X | | X | 340 |
| Example 5 | | | X | X | | | X | X | | | | X | | X | 750 |
| Example 7 | | | | X | | | | | X | | | | | X | 320 |
| Example 8 | | | | X | | | X | X | | | | | | X | 800 |
| Example 9 | X | | | X | X | | X | | | | | | | X | 650 |
| Example 10 | | X | X | | | | | | | X | X | X | X | | 9 |
| Example 11 | | | X | | | | | | X | | X | X | X | | 28 |
| Example 12 | | X | X | | | | X | | | | | X | X | | 25 |

Figure 1

| Run | HBr Dosing (ppmdv) | Fabric Filter Inlet Hg (total) [lb/TBtu] | Stack Hg (total) | Fabric Filter Total Hg Removal (%) | Fabric Filter Inlet Hg0 (lb/TBtu) | Stack Hg0 (lb/TBtu) | Fabric Filter Inlet Hg2+ (lb/TBtu) | Stack Hg2+ (lb/TBtu) |
|---|---|---|---|---|---|---|---|---|
| 1 | 0 | 19.79 | 11.11 | 43.9 | 13.14 | 9.89 | 2.58 | 1.23 |
| 2 | 0 | 19.79 | 12.85 | 35.1 | 13.39 | 12.18 | 0.78 | .67 |
| 3 | 7 | 28.69 | 9.45 | 67.1 | 10.76 | 7.25 | 2.99 | 2.02 |
| 4 | 7.8 | 27.9 | 4.12 | 85.2 | 4.42 | 1.55 | 1.07 | 2.53 |
| 5 | 5.6 | 27.94 | 1.8 | 93.6 | 1.49 | 0.81 | 1.89 | 0.94 |
| 6 | 1.7 | 23.43 | 11.06 | 52.8 | 8.27 | 6.31 | 3.58 | 4.74 |
| 7 | 3.7 | 23.4 | 8.54 | 63.5 | 11.32 | 5.94 | 1.23 | 2.60 |
| 8 | 6.2 | 23.39 | 3.12 | 86.7 | 10.42 | 1.99 | 2.47 | 1.09 |
| 9 | 7.1 | 24.95 | 5.49 | 78 | 6.05 | 3.49 | 2.17 | 1.92 |
| 10 | 5.8 | 24.95 | 6.88 | 72.4 | 7.31 | 5.72 | 0.81 | 1.09 |
| 11 | 6.7 | 25.09 | 5.61 | 77.6 | 7.38 | 4.36 | 0.66 | 1.19 |
| 12 | 6.5 | 28.93 | 3.59 | 87.6 | 3.06 | 2.55 | 4.43 | 1.02 |
| 13 | 7.2 | 28.89 | 2.92 | 89.9 | 2.14 | 2.47 | 4.23 | 0.43 |

Fig. 13

| IUPAC | Formula | Structure |
|---|---|---|
| 2-(bromomethyl)oxirane | C₃H₅BrO | |
| 1-bromopropan-2-one | C₃H₅BrO | |
| 1-bromobutane | C₄H₉Br | |
| 2-bromobutane | C₄H₉Br | |
| 1-bromo-2-methylpropane | C₄H₉Br | |
| 1-bromo-3-methylpropane | C₅H₁₁Br | |
| 2-bromo-2-methylbutane | C₅H₁₁Br | |
| 1-bromopentane | C₅H₁₁Br | |
| 2-bromopentane | C₅H₁₁Br | |

Fig. 38A

| IUPAC | Formula | Structure |
|---|---|---|
| 2-bromopentane | $C_5H_{11}Br$ | |
| 1-bromo-2-ethoxyethane | $C_4H_9BrO$ | |
| bromobenzene | $C_6H_5Br$ | |
| 2-bromopyridine | $C_5H_4BrN$ | |
| dibromomethane | $CH_2Br_2$ | |
| (Z)-1,2-dibromoethene | $C_2H_2Br_2$ | |
| (E)-1,2-dibromoethene | $C_2H_2Br_2$ | |
| 1,1-dibromoethane | $C_2H_4Br_2$ | |

Fig. 38B

| IUPAC | Formula | Structure |
|---|---|---|
| 1,2-dibromoethane | C₂H₄Br₂ | 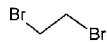 |
| 2,2-dibromoacetonitrile | C₂HBr₂N | 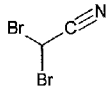 |
| 2,3-diproprop-1-ene | C₃H₄Br₂ | 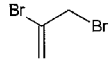 |
| 2-bromoacetyl brominde | C₂H₂Br₂O | 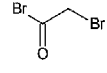 |
| 1,2-dibromopropane | C₃H₆Br₂ | 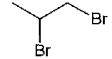 |
| 1,3-dibromopropane | C₃H₆Br₂ | 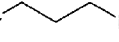 |
| 1,3-dibromobutane | C₄H₈Br₂ | 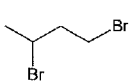 |
| 1,4-dibromobutane | C₄H₈Br₂ |  |
| 1,3-dipropropan-2-ol | C₃H₆Br₂O | 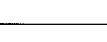 |
Fig. 38C

| IUPAC | Formula | Structure |
|---|---|---|
| 2,3-dibropropan-1-ol | $C_3H_6Br_2O$ | 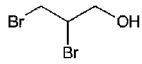 |
| 1,4-dibromopentane | $C_5H_{10}Br_2$ | 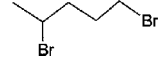 |
| 1,5-dibromopentane | $C_5H_{10}Br_2$ |  |
| 1-bromo-2-(2-bromoethoxy)ethane | $C_4H_8Br_2O$ | 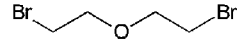 |
| (1R,2R)-1,2-dibromocyclohexane | $C_6H_{10}Br_2$ |  |
| 1,6-dibromohexane | $C_6H_{12}Br_2$ |  |
| Dibromomethylbenzene | $C_7H_6Br_2$ | 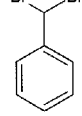 |
Fig. 38D

| IUPAC | Formula | Structure |
|---|---|---|
|  | C₈H₁₆Br₂ |  |
| 1,8-dibromooctane | C₂HBr | 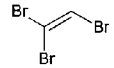 |
| 2,2,2-tribromoacetaldehyde | C₂HBr₃O | 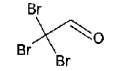 |
| 1,1,2,2-tetrabromoethane | C₂H₂Br₄ | 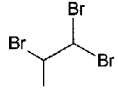 |
Fig. 38E

EMISSION CONTROL SYSTEM This application is a continuation application of non-provisional application Ser. No. 13/926,243 filed on Jun. 25, 2013, which claims the benefit of non-provisional application Ser. No. 13/364,059 filed on Feb. 1, 2012. This application also claims the benefit of provisional application No. 61/438,404 filed on Feb. 1, 2011 entitled "Emission Control System" and provisional application No. 61/527,949 filed on Aug. 26, 2011 entitled "HBr Treatment."

This application claims the benefit of non-provisional application Ser. No. 13/364,059 filed on Feb. 1, 2012 entitled "Emission Control System". This application claims benefit of provisional application No. 61/438,404 filed on Feb. 1, 2011 and entitled "Emission Control System." This application claims the benefit of provisional application No. 61/527,949 filed on Aug. 26, 2011 and entitled "HBr Treatment."

As used herein, references to HBr injection concentration are recorded as HBr on a parts per million dry flue gas by volume basis (ppmvd). Indications of ppmvd concentrations represent only the gas phase concentration including constituents entrained in the gas but excluding any constituents not entrained in the gas. Thus HBr (or active bromine) attached to gas entrained fly ash would be included in HBr ppmvd numbers but HBr in fly ash attached to a conduit wall would not be included. Accordingly, for the purposes of this disclosure, indications of HBr concentration in the units ppmvd are calculated as if any HBr bound to entrained fly ash or other entrained particulate matter were in the vapor phase. In cases where other compounds are injected or the gas is not a flue gas, the calculation of ppmvd remains the same. As used herein, gas concentrations indicated in the units $\mu g/m^3$ represent concentration at standard conditions of 68° F. and 14.696 psi.

Methods of treating mercury contaminated gas described herein may, for example, comprise introducing a hydrogen halide selected from HBr and HI into a mercury contaminated gas stream containing a quantity of particulate matter at an introduction rate sufficient to create a concentration of at least 0.1 ppmvd; wherein greater than 50% of all particulate matter in the mercury contaminated gas stream is native particulate matter; contacting a quantity of active bromine with the native particulate matter; creating a doped particulate matter; coating a filtration media with the doped particulate matter; and passing a portion of the mercury contaminated gas stream through the doped particulate matter on the filtration media. In a related method, the hydrogen halide selected from HBr and HI is HBr. In a related method, the introducing of a hydrogen halide selected from HBr and HI may occur at a point where the mercury contaminated gas stream is less than 750° F. In a related method, the introduction of a hydrogen halide selected from HBr and HI occurs at a point, where the mercury contaminated gas stream is greater than 180° F. In another related method, the mercury contaminated gas stream is a byproduct of the combustion of coal having a chlorine content of less than 300 ppm by weight and a mercury content greater than 50 ppb by weight. In a further related method, the introduction of a hydrogen halide selected from HBr and HI is at an introduction rate creating a concentration of at most 15 ppmvd.

Methods of treating mercury contaminated gas described herein may, for example, comprise introducing dilute aqueous HBr into a mercury contaminated gas stream containing a quantity of particulate matter at an HBr introduction rate sufficient to create a HBr concentration of at least 0.1 ppmvd; contacting a quantity of active bromine with a portion of the quantity of particulate matter; creating a doped particulate matter from the quantity of active bromine and the quantity of particulate matter; and inducing electrostatic forces thereby removing greater than 50% of the doped particulate matter from the mercury contaminated gas stream. In a related method, mercury is collected on the doped particulate matter. In a further related method, the electrostatic forces occur within an electrostatic precipitator. In a still further related method, the introduction of dilute aqueous HBr is at an introduction rate creating a HBr concentration of at most 10 ppmvd.

Methods of treating mercury contaminated gas described herein may, for example, comprise introducing a mercury contaminated gas into a conduit; wherein the conduit comprises HBr susceptible materials; wherein the mercury contaminated gas has an initial quantity of mercury; wherein the conduit has an inner surface; injecting a quantity of dilute aqueous HBr into the conduit; wherein the injection of the quantity of dilute aqueous HBr is through a plurality of nozzles at an HBr injection rate sufficient to create a HBr concentration of at least 0.1 ppmvd; wherein a spray pattern of the plurality of nozzles covers a majority of a cross-section of the conduit; wherein, there is no substantial accumulation of aqueous HBr on the inner surface; and contacting the mercury contaminated gas with a media thereby removing at least 50% of the initial quantity of mercury from the mercury contaminated gas. In a related method, the injection of the quantity of dilute aqueous HBr occurs at a point where the mercury contaminated gas is between 180° F. and 750° F. In a further related method, the injection of the quantity of dilute aqueous HBr occurs at a point where the mercury contaminated gas is between 180° F. and 750° F. In a still further related method, the plurality of nozzles is a plurality of dual fluid nozzles and the HBr concentration in the dilute aqueous HBr is greater than 0.25%. In a still further related method, the injection of the quantity of dilute aqueous HBr is through a plurality of nozzles at an HBr injection rate creating a HBr concentration of at most 10 ppmvd.

Methods of treating a mercury contaminated gas described herein may, for example, comprise introducing active bromine into a treatment zone; passing a mercury contaminated gas stream through the treatment zone; wherein the mercury contaminated gas stream contains nitrogen; wherein a residence time of the active bromine in the treatment zone is at least 1.1 times that of a residence time of the nitrogen in the treatment zone; and removing at least 50% of the mercury contained in the mercury contaminated gas stream from the mercury contaminated gas stream with a particulate control device. In a related example, active bromine may be introduced into the treatment zone at an introduction rate that creates an active bromine concentration of between 0.1 ppmvd and 10 ppmvd. In a series of related examples, the residence time of the active bromine in the treatment zone may be at least 1.2 times, 1.5 times or even 2.0 times that of a residence time of the nitrogen in the treatment zone.

Methods of treating flue gas described herein may, for example, comprise introducing active bromine into a treatment zone; introducing ammonia into the treatment zone; passing a quantity of flue gas having an initial ash content and having an initial mercury content through the treatment zone; collecting at least 80% of the initial ash content in a particulate control device; and collecting at least 50% of the initial mercury content in the particulate control device, in a related example, the ash collected in the particulate control device has a total ammonia content of at least 40 ppm weight. In a further related example, the ash collected in the particulate control device contains at least 60% of the initial mercury content. In a still further related example, active bromine is introduced into the treatment zone at an introduction rate that creates an active bromine concentration of between 0.1 ppmvd and 10 ppmvd.

In various embodiments described herein, ash compositions having special properties are prepared. Sometimes these ash compositions are referred to as "conditioned ash sorbent" As that term is used herein, "conditioned ash sorbent" designates ash having an active bromine content greater than 20 ppm by weight As that term is used herein "active bromine" designates HBr and its direct disassociation products that contain a bromine atom. Examples of compounds that may be characterized as "active bromine" include HBr, Bromine radical, and $Br^{-1}$. In addition to the basic active bromine concentration of conditioned ash sorbent, conditioned ash sorbent as practiced in the many individual variations of embodiments described herein may have an active bromine content of greater than 60 ppm, greater than 100 ppm, greater than 200 ppm, less than 2000 ppm, less than 5000 ppm, and less than 10,000 ppm. Treatment of flue gas according to the methods described herein may, for example, cause mercury to be removed from the flue gas by attachment to fly ash without any substantial re-emission of mercury before that fly ash is removed from the flue gas. Treatment of flue gas as described herein may cause greater than 90% of all bromide atoms in the flue gas to be in the form of active bromine throughout the zone in which the mercury containing flue gas is being treated. Emissions of filterable particulate matter may be reduced by treatments described herein in systems having an electrostatic precipitator.

Methods of treating flue gas described herein may, for example, comprise passing a flue gas through a treatment zone; introducing a hydrogen halide selected from HBr and HI into the treatment zone at a rate sufficient to create a concentration of at least 0.1 ppmvd; producing a conditioned ash sorbent on a plurality of surfaces of the treatment zone such that the treatment zone has a treatment area to flue gas flow ratio of at least 0.3 min/ft; and continuing the introduction of the hydrogen halide selected from HBr and HI into the treatment zone until the treatment zone attains a cumulative injection level of 60 ppmvd*hrs. In a related example, the hydrogen halide selected from HBr and HI is HBr. In a further related example, the introducing of the hydrogen halide selected from HBr and HI into the treatment zone is at an introduction rate that creates an active bromine concentration of less than 10 ppmvd. In distinct related embodiments, the treatment area to flue gas flow ratio may be at least 0.3 min/ft, at least 0.5 min/ft, and at least 3.0 min/ft.

A method of treating a mercury contaminated gas described herein may, for example, comprise combusting a fuel containing at least 50 ppb mercury by weight; combusting a substantial quantity of a treatment composition; wherein the treatment composition is selected from: 2-(bromomethyl)oxirane; 1-bromopropan-2-one; 1-bromobutane; 2-Bromobutane; 1-bromo-2-methylpropane; 1-bromo-3-methylbutane; 2-bromo-2-methylbutane; 1-bromopentane; 2-bromopentane; 2-bromopentane; 1-bromo-2-ethoxyethane; bromobenzene; 2-bromopyridine; dibromomethane; 1,2-dibromoethene; 1,1-dibromoethane; 1,2-dibromoethane; 2,2-dibromoacetonitrile; 2,3-dibromoprop-1-ene; 2-bromoacetyl bromide; 1,2-dibromopropane; 1,3-dibromopropane; 1,3-dibromobutane; 1,4-dibromobutane; 1,3-dibromopropan-2-ol; 2,3-dibromopropan-1-ol; 1,4-dibromopentane; 1,5-dibromopentane; 1-bromo-2-(2-bromoethoxy)ethane; (1R,2R)-1,2-dibromocyclohexane; 1,6-dibromohexane; dibromomethylbenzene; 1,8-dibromooctane; 1,1,2-tribromoethene; 2,2,2-tribromoacetyladehyde; and 1,1,2,2-tetrabromoethane; and comingling at least one product from the combusting of the fuel and at least one product from the combusting of the substantial quantity of the treatment composition. In a related example, the treatment composition is bromoethane. In another related example, the treatment composition is bromoform. In another related example, the treatment composition is dibromomethane. In another related example the treatment composition is 1,2-dibromoethane. In another related example, the treatment composition is 1,2-dibromoethene.

As may be appreciated from the examples below, various embodiments described herein may have one or more of the following features: In separate but related embodiments, the temperature of the flue gas immediately prior to the point of injection of the aqueous solution of HBr may be less than 1100° F., less than 750° F., and less than 710° F. In separate but related embodiments, the temperature of the flue gas immediately prior to the point of injection of the aqueous solution of HBr may be greater than 180° F., greater than 200° F., greater than 220° F., greater than 325° F., and greater than 425° F. As an example, the temperature of the flue gas immediately prior to the point of injection of the aqueous solution of HBr may be about 700° F. The exhaust gas may be an exhaust gas from a calcining process. The exhaust gas may also be an exhaust gas from an ore roasting process. The flue gas may further be flue gas from a coal-fired, power plant or a boiler. In a series of distinct but related examples, methods described herein may be used to treat coal having a chlorine content of less than 500 ppm by weight, coal having a chlorine content of less than 300 ppm by weight, and coal having a chlorine content of less than 100 ppm by weight. Treatments described herein may oxidize greater than 50% of any Hg(0) present in the flue gas into Hg(II) and may oxidize greater than 80% of any Hg(0) present in the flue gas into Hg(II). Coal combusted and subjected to treatments described herein may have a mercury content of greater than 0.05 µg per gram coal, greater than 0.10 µg per gram coal or even greater than 0.15 µg per gram coal. Flue gases treated by the methods described herein may have a mercury content of greater than 1.0 µg/dscm, greater than 2.0 µg/dscm, or even a mercury content of greater than 4.0 µg/dscm. While examples described herein illustrate the effectiveness of HBr, it is also contemplated that compositions such as HF, HCl, HBr, HI, $F_2$, $Cl_2$, $Br_2$, and $I_2$ may be utilized in a similar manner with varying degrees of effectiveness. In certain embodiments, the halogen containing additive supplied may be supplied to the flue gas at 300 ppm or less of the weight of total of coal and additive supplied (i.e. roughly less than 0.3 g HBr added per kg coal combusted). In separate but related embodiments, the additive may be supplied at 250 ppm or less, at 200 ppm or less, at 200 ppm or less, at 150 ppm or less, or even at 100 ppm or less. In many practiced embodiments, less than 20 weight percent of the mercury in the coal is released to the atmosphere and in some cases less than 10 weight percent of the mercury in the coal was released to the atmosphere.

BRIEF DESCRIPTION OF THE DRAWINGS

FIG. 1 is a chart describing features of various examples.

FIG. 13 shows oxidation results from Example 5.

FIGS. 38A-38E present organohalogens that may be combusted for the treatment of flue gas.

EXAMPLES

A wide variety of commercial scale coal-fired power plants and steam plants were tested to determine the viability of HBr injection under different operating conditions and test configurations. FIG. 1 of the drawings is a representation of the wide variety of configurations tested. In each of the examples of FIG. 1, a significant reduction in mercury emissions was accomplished through HBr injection and in many cases other benefits were demonstrated. As used in FIG. 1 and elsewhere throughout this disclosure, "SCR" indicates the presence of a selective catalytic reduction system, "SNCR" indicates the presence of a selective non-catalytic reduction system, "FF/BH" indicates the presence of a fabric filter or baghouse, "ESP" indicates the presence of an electrostatic precipitator, "DFGD" indicates the presence of dry flue gas desulfurization, "WFGD" indicates the presence of wet flue gas desulfurization, "PRB" indicates that powder river basin coal was used as fuel, "Lignite" indicates that lignite coal was used as fuel, "Bituminous" indicates that by bituminous coal was used as fuel, "Biomass" indicates that the biomass was used as fuel, "Trona" indicates that trona was used to absorb flue gas constituents, "Carbon" indicates that carbon was used to absorb flue gas constituents, "Steam" indicates that the plant was used primarily tor the generation of steam, and "Electric" indicates that the plant was used primarily for the generation of electricity. FIG. 1 also lists approximate full load generating capacity for the plants tested as megawatts with steam generating plants represented as megawatt equivalents.

Examples 1A-1E

A series of experiments were conducted on a plant having general characteristics described in FIG. 1. Emission characteristics, in particular mercury emissions, were evaluated under a variety of operating conditions. During the evaluation associated with Examples 1A-1E, halogenated fluids and trona were applied at various points in the process. Testing and observations associated with Examples 1A-1E were over a four-day period.

Figure 2:
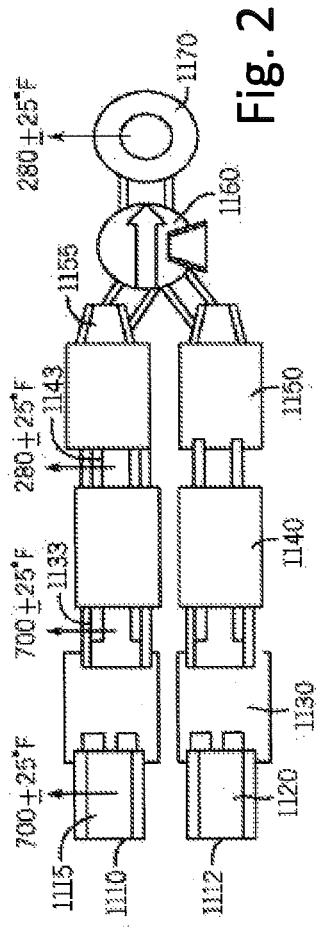
FIGS. 2 and 3 represent the layout of the plant tested in Examples 1A-1E.
Figure 3:
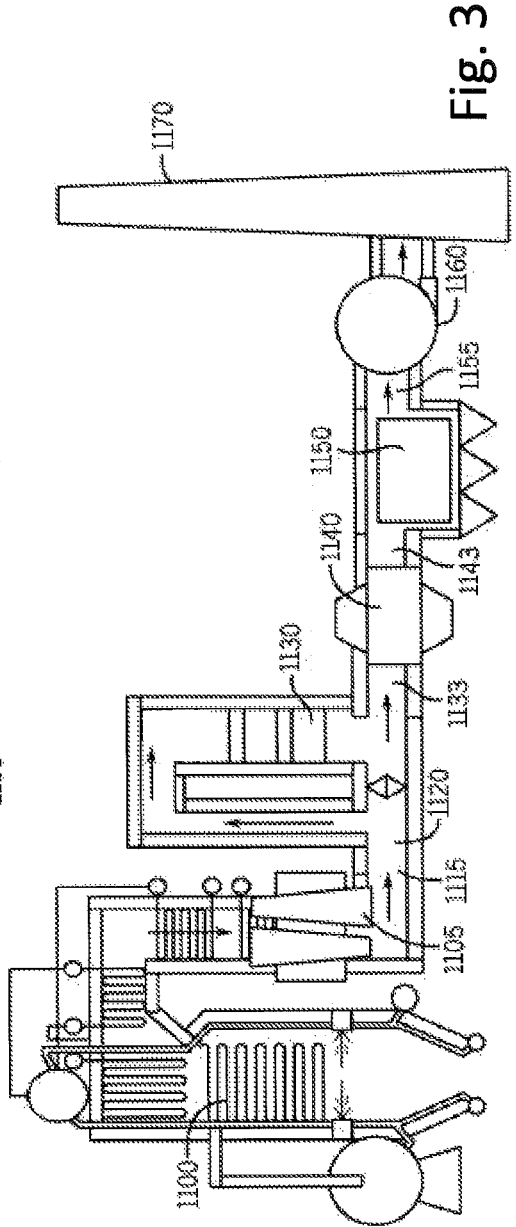

The pulverized coal boiler tested had a nominal unit capacity of 670 MW and was burning sub-bituminous coal. $NO_x$ was controlled using a selective catalytic reduction system. A cold-side electrostatic precipitator provided particle control. The embodiment of FIGS. 2 and 3 represents the configuration on which the tests of Examples 1A-1E were conducted. Pulverized coal boiler 1100 and economizer 1105 precede the flue gas treatment steps of the process. The flue gas is split into two separate ducts, duct A 1110 and duct B 1112 where treatment for pollutant control is conducted. Injection of HBr solution associated with Examples 1A-1E occurred at injection point 1115. No equivalent injection occurred at the equivalent point in the duct B 1120. Trona injection point 1133 was in duct A 1110 downstream of the SCR 1130. The alternate location for Trona injection 1143 was between the air preheater 1140 and the electrostatic precipitator 1150. Speciated mercury testing 1155 was conducted at the exit of electrostatic precipitator 1150 prior to the induced draft fan 1160 which vents to stack 1170.

As indicated in FIGS. 2 and 3, the HBr injection was performed prior to the SCR system's Duct "A," 1110 approximately 30 feet upstream of the ammonia injection grid (AIG). The trona injection was performed upstream and downstream of the air pre-heater (APH), depending on the specific test objectives. Hg emission speciation was measured at Duct "A" 1110 of Unit 3's ESP outlet 1150 while the stack Hg CEMS data was also being documented. All Duct "A" Hg emission measurements were determined using EPA Method 30B with speciation sorbent traps.

Mercury control was conducted in a two step process. The first step was to promote Hg oxidation from Hg(0) to Hg(II) because Hg(II) is somewhat water soluble and tends to bind with the surface area of fly ash particles. Mercury oxidation may be effectively accomplished through the addition of a halogen chemical additive. The chemical additives discussed herein were demonstrated to provide a high degree of oxidation per unit mass of additive. In each of Examples 1A-1D, the chemical additive that was tested was an aqueous solution of HBr applied to the flue gas by the air atomizing nozzles described below.

Example 1A

Baseline Testing Day 1

One set of speciated EPA Method 30B tests were conducted under the boiler's baseline operating conditions in the absence of either HBr additives or Trona. The baseline flue gas HgT was 5.28 µg/dscm (5.28 micrograms HgT per dry standard cubic meter of gas), with 5.15 µg/dscm (97.5%) of the mercury having an oxidation or valance state of zero (Hg(0)). This is typical of powder river basin coal-fired applications, due to the low concentration of chlorine or other native oxidants in PRB coal.

Example 1B

HBr Testing Day 2

Four runs of testing were performed at the APH outlet under various Trona/HBr injection conditions. The testing matrix and Hg removal results can be found in Table 1. The total HBr injection time on day 2 was 4 hours.

TABLE 1

Test Parameters and Results (Day 2)

| Run No. (Run Time) | Solution & Injection Rate | Hg(II) µg/dscm | Hg(0) µg/dscm | HgT* µg/dscm |
|---|---|---|---|---|
| Run 1 (1150-1405) | Trona @ 5300 lb/hr HBr (N/A) | N/A | N/A | 6.15 |
| Run 2 (1515-1614) | Trona @ 7000 lb/hr HBr (N/A) | 0.56 | 6.10 | 6.66 |
| Run 3 (1710-1830) | Trona @ 8500 lb/hr HBr @ 45 ppmvd | 0.71 | 1.10 | 1.81 |
| Run 4 (2001-2100) | Trona @ 8500 lb/hr HBr @ 28 ppmvd | 0.62 | 1.33 | 1.95 |

*HgT represents total mercury in all oxidation states.

During Runs 1 and 2, no HBr solution was injected, but trona was injected at a rate of just under 5300 lb/hr and 7000 lb/hr. Mercury concentrations at these rates were 6.15 µg/dscm HgT and 6.66 µg/dscm HgT, respectively. Run 2 results indicated that Hg(0) was at 6.10 µg/dscm, which accounted for 92.3% of the total mercury (HgT).

After the first two runs, trona injection was set at 8500 lb/hr and the HBr injection was set at approximately 45 ppmvd (parts per million on dry volume basis) or (78 gallons per hour) for a period of two hours. The HBr/Trona combined injection yielded 82% Hg oxidation and 73% Hg removal. The HgT and Hg(0) concentration was 1.81 µg/dscm and 1.10 µg/dscm, respectively.

During Run 4, the HBr injection was reduced to 28 ppmvd or 49 GPH and was maintained at this rate for a two-hour period. The ammonia was temporarily stopped on the "A" side. This was to determine whether there was any interference to the HBr operation from the NH$_3$ injection. The HgT and Hg(0) concentrations were 1.95 µg/dscm and 1.33 µg/dscm, respectively. The HBr/Trona combined injection yielded 78% Hg oxidation and 71% Hg removal. Both the Trona injections and the HBr injections were stopped at 2100 hours. Based on a HBr injection point 30 ft upstream from the ammonia injection grid, no interference was observed in HBr performance when the ammonia injection was stopped.

Figure 4:
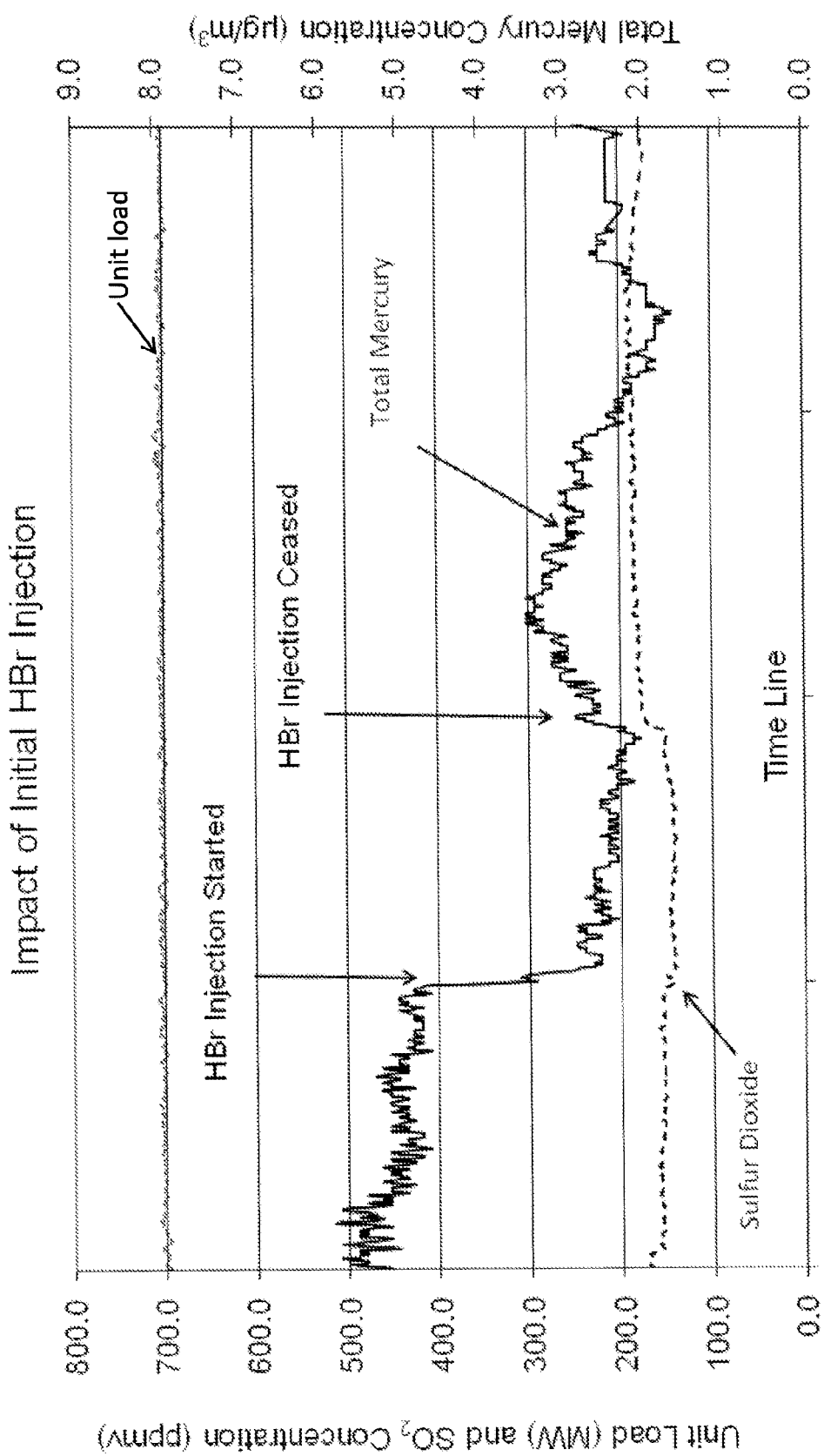
FIG. 4 is a plot of total mercury concentration during the test of Example 1B.

The data trends from the stationary continuous emission monitoring systems (CEMS) were also documented, and results are shown in FIG. 4. The mercury CEMS unit monitors HgT in the stack, after the flows of Duct A and Duct B have been recombined. As seen in FIG. 4, the unit was brought to a full load of approximately 700 MW for the test days and was maintained at that load throughout. FIG. 4 begins at midnight on day 2 and runs until 0712 hours on day 3. The HgT concentration during the first two runs averaged 5.1 µg/dscm. Based on the baseline testing on day 1, the first two runs of parametric testing on day 2 and the Hg CEMS data average, it is estimated that the native HgT emission concentration varied between 5 µg/dscm and 6 µg/dscm. Furthermore, it is estimated that prior to the HBr injection, the flue gas from both ducts contained around 5.5 µg/dscm of HgT emission.

After the HBr injection of run 3 began, the Hg data trend showed immediate removal, as recorded on the stationary Hg CEMS. During the last two runs, the stack Hg concentration averaged 2.5 µg/dscm. The flue gas on the "A" side was treated while the flue gas on the "B" side remained untreated. Given that the volumetric flow rates of gases through Duct A and Duct B were approximately equal, based on a stack Hg CEMS reading of 2.5 µg/dscm, the HgT concentration on the treated "A" side was approximately zero. The maximum total Hg removal on the "A" side was calculated to be above 95%, based on the stationary Hg CEMS.

After correcting for a bypass stream, total Hg removal in the treated stream was calculated to be approximately 89%, based on the stationary Hg CEMS after Trona and HBr injections were stopped. As mentioned above, both the Trona and HBr injections were stopped at around 2100 hours. The total Hg trend did not return to the baseline concentration (5.5 µg/dscm) right away, based on the readings from the stack Hg CEMS. As seen in FIG. 4, mercury concentration stayed below baseline from the point that HBr injection began until the following morning. This residual effect may be attributable to the HBr chemical additive previously injected that was retained on the ash and SCR catalyst loaded into the SCR.

Example 1C

Day 3

On the third day of testing, the trona injection was moved from the ESP inlet to the APH inlet, and the unit was maintained at full load at around 700 MW. The testing matrix and Hg results are summarized in Table 2.

TABLE 2

Test Parameters and Results (Day 3)

| Run No. (Run Time) | Solution & Injection Rate | Hg(II) μg/dscm | Hg(0) μg/dscm | HgT μg/dscm |
|---|---|---|---|---|
| Run 0 (0600-0630) | Trona (N/A) HBr (N/A) | N/A | N/A | 1.22* |
| Run 1 (1000-1100) | Trona@ 5300 lb/hr HBr (N/A) | 0.49 | 3.00 | 3.44 |
| Run 2 (1229-1332) | Trona @ 7000 lb/hr HBr (N/A) | 0.38 | 3.93 | 3.98 |
| Run 3 (1526-1620) | Trona @ 8500 lb/hr HBr (N/A) | 0.63 | 4.25 | 4.60 |

*not representative of a baseline conditions due to effects from the previous day.

Figure 5:
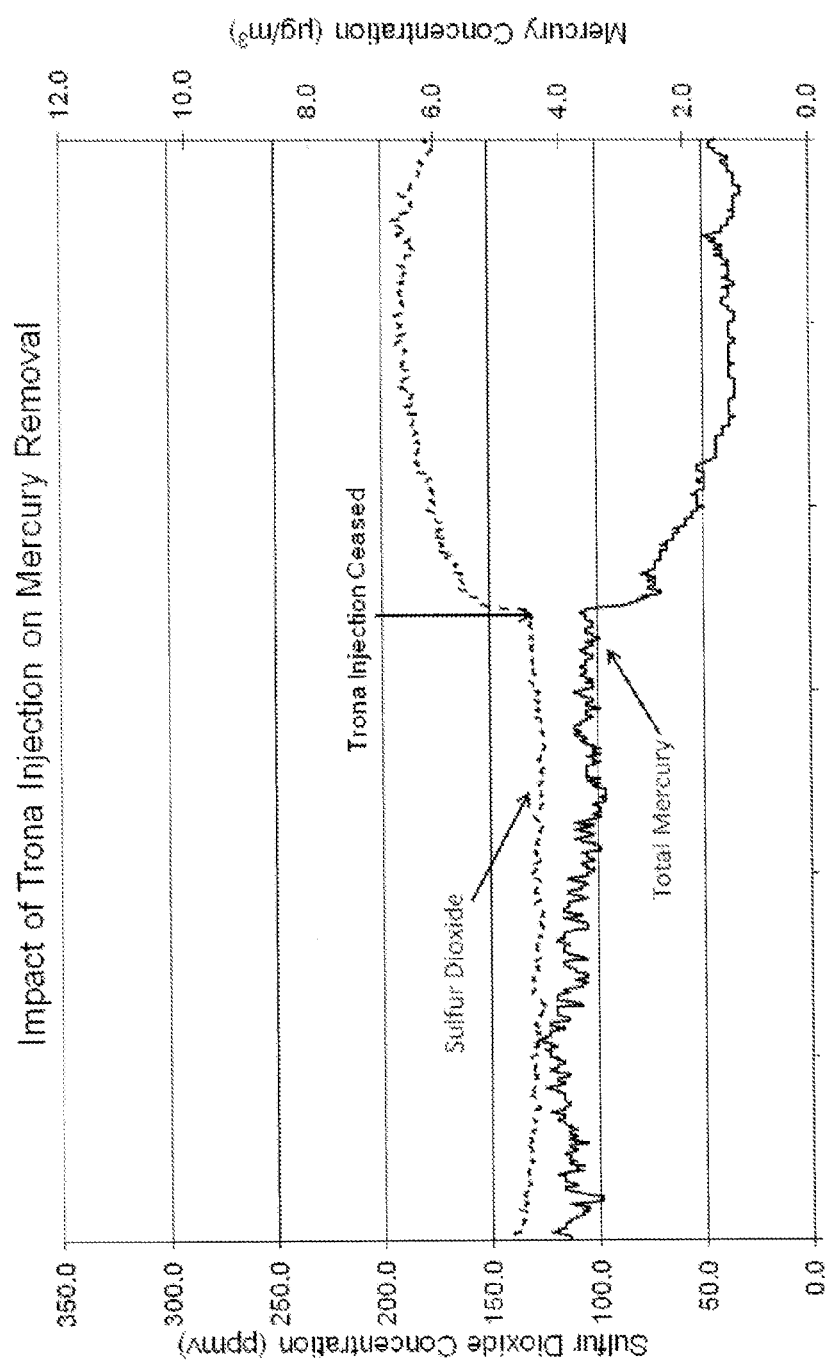
FIG. 5 is a plot of total mercury concentration during the test of Example 1C.

As shown in Table 2, the recovery of Hg concentration remained below baseline conditions (between 5 μg/dscm and 6 μg/dscm) from the injections of the previous day. At 0630, the baseline Hg was still measured at 1.22 μg/dscm, which represented 78% total Hg removal hours after actual HBr injection ceased. At 1600 pm, while Trona injection was underway, the HgT emission was 4.88 μg/dscm. The stack CEMS data trends can be found in FIG. 5. FIG. 5 which begins at 0930 hours on day 3 and ends at 0000 hours on day 4, shows that during the Trona injection of day 3 HgT levels were below baseline concentrations and that when Trona injection ceased HgT levels dropped rapidly even further below baseline to approximately 2 μg/m$^3$. This is evidence of the strong residual effects of the HBr injected on the previous day, which was interrupted by sorption by trona during the period of trona injection.

At approximately 0930 hours, Trona injection was initiated upstream of the APH inlet. The stack Hg CEMS data averaged 2.4 μg/dscm. In order for the stack HgT CEMS to read approximately 2.4 μg/dscm, the Hg concentration on the "A" side would have to be almost zero. Thus, it could be concluded that the total Hg removal was above 95% for the treated duct (from the baseline Hg concentration of 5.5 μg/dscm), based on the stationary Hg CEMS. CEMS data showed that the residual effects of day 2 HBr injections lasted at least 16 hours. This included 4 hours of actual injection and 12 hours of residual effect.

When the APH inlet Trona injection was started, the total Hg concentration would increase; and immediately after the APH inlet Trona injection was stopped, the Hg concentration would decrease. Not wishing to be bound by theory, the Trona may have interacted with the HBr additive, inhibiting the oxidation of Hg(0). Embodiments that alter the interaction of Trona with HBr described in this example are contemplated. For example, Trona may be injected further downstream to provide sufficient residence time for the HBr solution to react with Hg(0). Not wishing to be bound by theory, a potential cause of the observed effect may include consumption of the HBr by the trona prior to the promotion of Hg oxidation and/or consumption of HBr effecting the equilibrium of the oxidation reaction involving the Hg.

Example 1D

Day 4

On the fourth day of testing, trona injection was resumed at the APH inlet at a constant rate of 8500 lb/hr, and the unit was maintained at full load at around 700 MW from 0930 onward. Both trona and HBr injections were started at around 0930 hours. There were four runs of HBr injections (with Trona injections) at 5 ppmvd (8.8 GPH), 10 ppmvd (17.3 GPH), and 15 ppmvd (26 GMT), and one injection at 15 ppmvd (26 GPH) with no Trona injection. The testing matrix and Hg results are summarized in Table 3.

TABLE 3

Test Parameters and Results (Day 4)

| Run No. (Run Time) | Solution & Injection Rate | Hg(II) μg/dscm | Hg(0) μg/dscm | HgT μg/dscm |
|---|---|---|---|---|
| Run 1 (0750-0900) | Trona (N/A) HBr (N/A) | 1.31 | 1.77 | 2.99 |
| Run 2 (1303-1428) | Trona @ 8500 lb/hr HBr @ 5 ppmvd | 0.94 | 3.24 | 4.18 |
| Run 3 (1303-1428) | Trona @ 8500 lb/hr HBr @ 10 ppmvd | 0.29 | 3.09 | 3.38 |
| Run 4 (1610-1545) | Trona @ 8500 lb/hr HBr @ 15 ppmvd | 0.67 | 2.29 | 2.96 |
| Run 5 (1849-1934) | Trona (N/A) HBr @ 15 ppmvd | 0.41 | 1.42 | 1.83 |

Run 1 of day 4 was not fully representative of baseline conditions because the unit was not operating at full load throughout the run. Under the various testing conditions of HBr injection, at the ESP outlet, the total Hg was 4.18 μg/dscm, which yielded approximately 24% of total Hg removal with 5 ppmvd HBr injection; 3.38 μg/dscm, which yielded approximately 39% of total Hg removal with 10 ppmvd HBr injection; and 2.96 μg/dscm, which yielded approximately 46% of total Hg removal with 15 ppmvd HBr injection. However, upon stopping the APH inlet Trona injection, the 15 ppmvd HBr injection yielded approximately 67% of total Hg removal and the ESP outlet HgT was 1.83 μg/dscm.

The Trona injection was stopped at around 0600 hours. The average stack Hg concentration was approximately 2.2 μg/dscm. The CEMS results closely agreed with the Run 4 sorbent trap results collected during the time period where stack Hg concentrations continued to decline. For the stack Hg CEMS to stabilize at around 2.2 μg/dscm, the Hg concentration on the "A" side would have to be essentially zero, which means more than a 95% total Hg removal. The HBr injection was finished at 1930 hours. Between 1930 and 2000 hours, before the unit load was brought down, the stack Hg concentration averaged 1.6 μg/dscm, yielding more than 95% total Hg removal. This is yet another example of the observed residual effects of HBr injection.

Example 1E

Days 5-6

Figure 6:
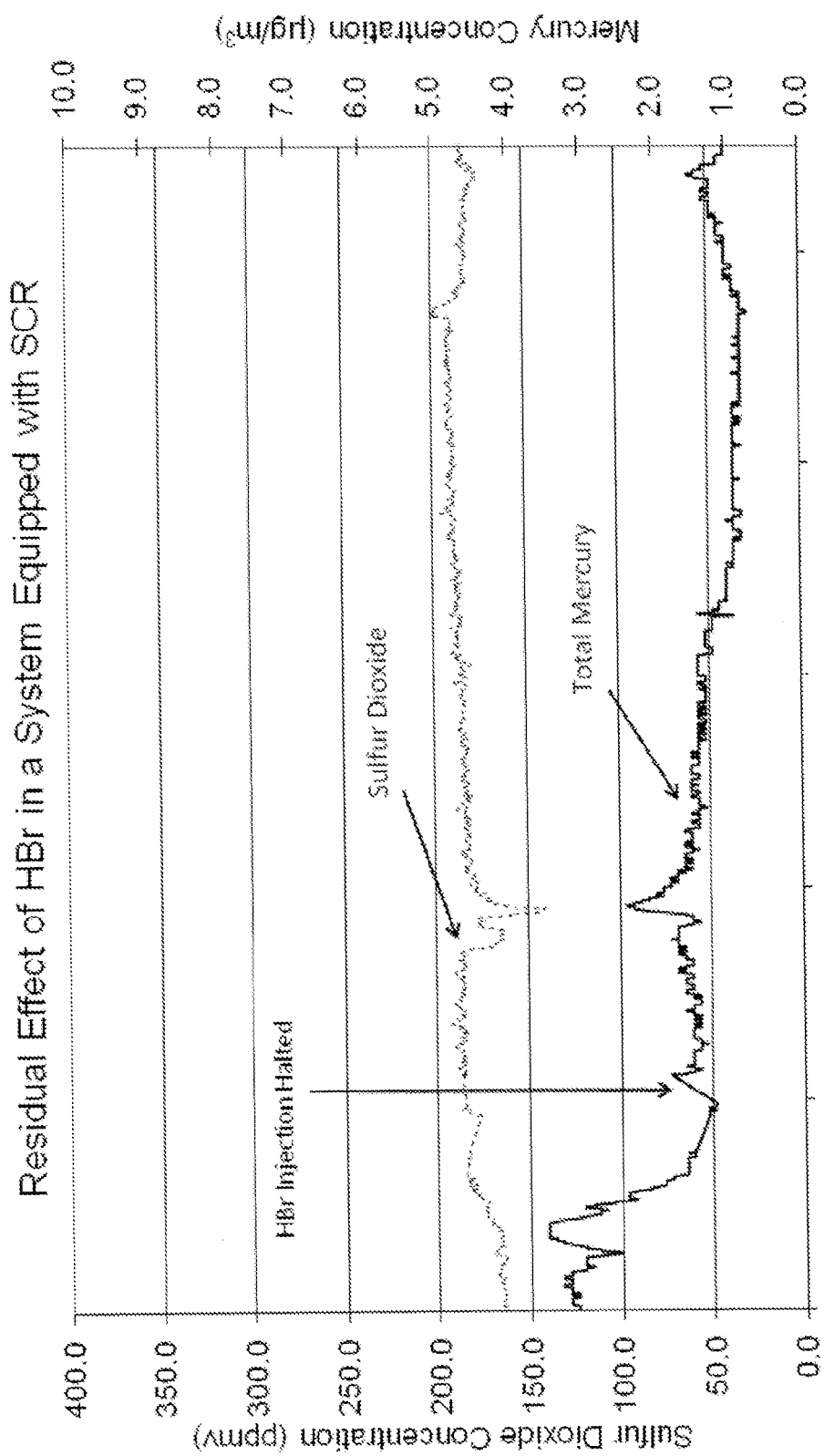
FIG. 6 is a plot of total mercury concentration during the test of Example 1E.

The HBr injection was finished at 1930 hours on day 4. However, the stack Hg CEMS still indicated that stack Hg concentrations were below 2.5 μg/dscm for 45 hours on the two days following the test, day 5 and day 6. This corresponds to more than 95% of total Hg removal. FIG. 6 displays data from this period. Removal of HgT was at least 80% with HBr injection, both without Trona injection and when Trona was injected prior to the ESP. CEMS results indicate that even greater removal efficiency, perhaps as high as 95%, was achieved. Tests associated with Examples 1A-1E indicate that HBr injection can be configured to remove greater than 80% of mercury from a flue gas, with alternate embodiments capable of removing greater than 90% of the total mercury and greater than 95% of the total mercury. The HBr injection yielded approximately 80% Hg oxidation and 75% Hg removal efficiencies from the baseline Hg concentration of 5.5 µg/dscm, as measured at the ESP outlet. The HBr injection yielded more than 90% Hg removal efficiency from the baseline Hg concentration of 5.5 µg/dscm, as measured at the stack from the stationary Hg CEMS.

During the three days of active testing associated with Examples 1A-1E, the HBr injection was performed only on the first day for four hours and on the third day for ten hours. The residual effect of the HBr solution lasted from 16 to 45 hours. From the initial HBr infection, mercury levels never returned to baseline during the duration of the multi-day testing program. Anecdotal reports after the test indicated that some residual effect from the HBr was still occurring more than a week after testing was completed. Based on the stack Hg CEMS, the residual effects of the HBr injection yielded more than 90% Hg removal efficiency. HBr injections in Examples 1A-1E were performed with concentrations of the injected solution ranging from about 1% HBr to about 4% HBr with higher concentrations being used for higher total HBr injection rates. In an alternate embodiment, HBr injection rates could be lower than those used in Examples 1B and 1D to account for those steady-state operational effects which are equivalent to the residual effects found in Examples 1A-1E.

Residual effects of the HBr injection can be clearly seen in the stationary Hg CEMS trend shown in FIG. 6 which covers day 5 from 0224 hours through day 6 at 0224 hours.

In separate prophetic examples, HBr would be injected at rates sufficient to maintain steady state mercury removal of 80%, 90%, or 95% of initial flue gas concentrations. Varying embodiments include the injection of HBr with or without the corresponding use of Trona.

Injection rates of the HBr may be varied to account for the total chlorine content of coal, and optimized based on chlorine content to meet pollution control standards with an economy of HBr. HBr injection rates may be varied to account for decreases in total available HBr due to the introduction and the location of the introduction of Trona. Increasing either the HBr concentration or the trona free HBr resonance time may overcome the adverse interaction between the HBr and trona.

Under the conditions of the present example, where the temperature in the duct was above 700° F., the HBr injection chemical solution produced no substantial consumption of the injected $NH_3$ for $NO_x$ control. Furthermore, the $NO_x$ removal did not vary more than 5% during the HBr Injection process, which could indicate no negative impact on the SCR performance or interaction with SCR catalysts.

In a prophetic example, the application of trona for control of acid gases is staged in the process such that the aqueous HBr or other chemical solution oxidizes an amount of Hg(0) into Hg(II) sufficient to bring the HgT within the applicable pollution control standard.

Example 2

Figure 7:
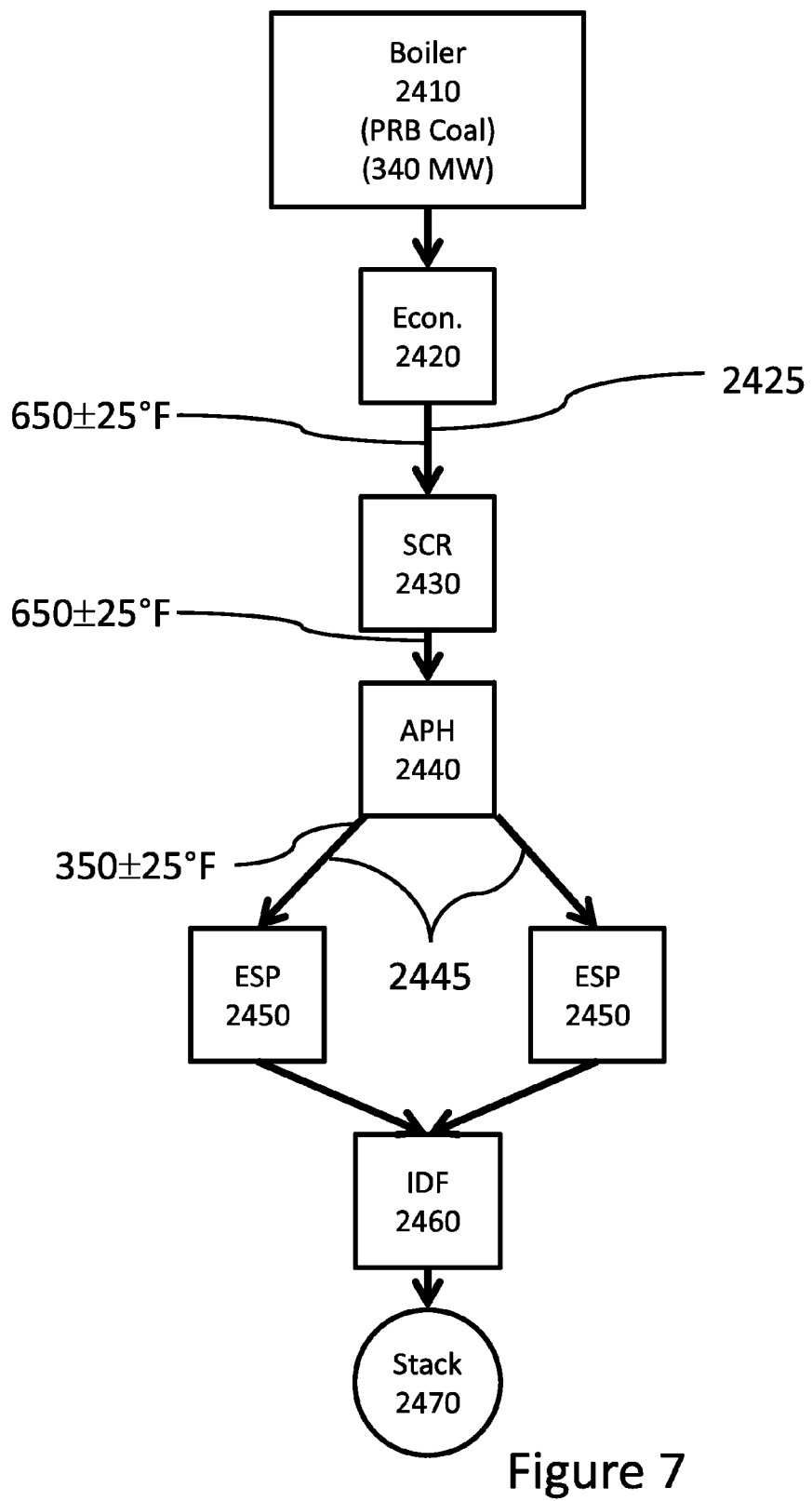
FIG. 7 represents the layout of the plant tested in Example 2.

Example 2 involved a field trial of HBr injection at a 340 MW coal-fired electric power generating station burning powder river basin coal. The air pollution control system was comprised of a selective catalytic reduction unit for nitrogen oxide control, a cold side electrostatic precipitator for particulate matter control, and an activated carbon injection system for mercury control. A schematic of the system configuration is presented in FIG. 7. Referring now to FIG. 7, boiler 240 supplies flue gas to economizer 2420. Flue gas from a economizer 2420 then passes through SCR 2430, air preheater 2440, and electrostatic precipitators 2450 before passing through ID fan 2460 and be released to the atmosphere by stack 2470. A majority of the test program was conducted at near full load (317 to 348 MW), while several tests were conducted at reduced load conditions (204, 299 MW). HBr injection concentrations ranged from 2.5 to 13.6 ppmvd over the test program.

The HBr injection system consisted of a series of lances installed at the economizer 2420 outlet, before the SCR 2430, where the temperature was approximately 650° F. The injection lances were of the air assisted type described later. The HBr injection was performed upstream of a SCR 2430 system tor the entire trial, and operation of the SCR, was not modified for the test program.

Figure 8:
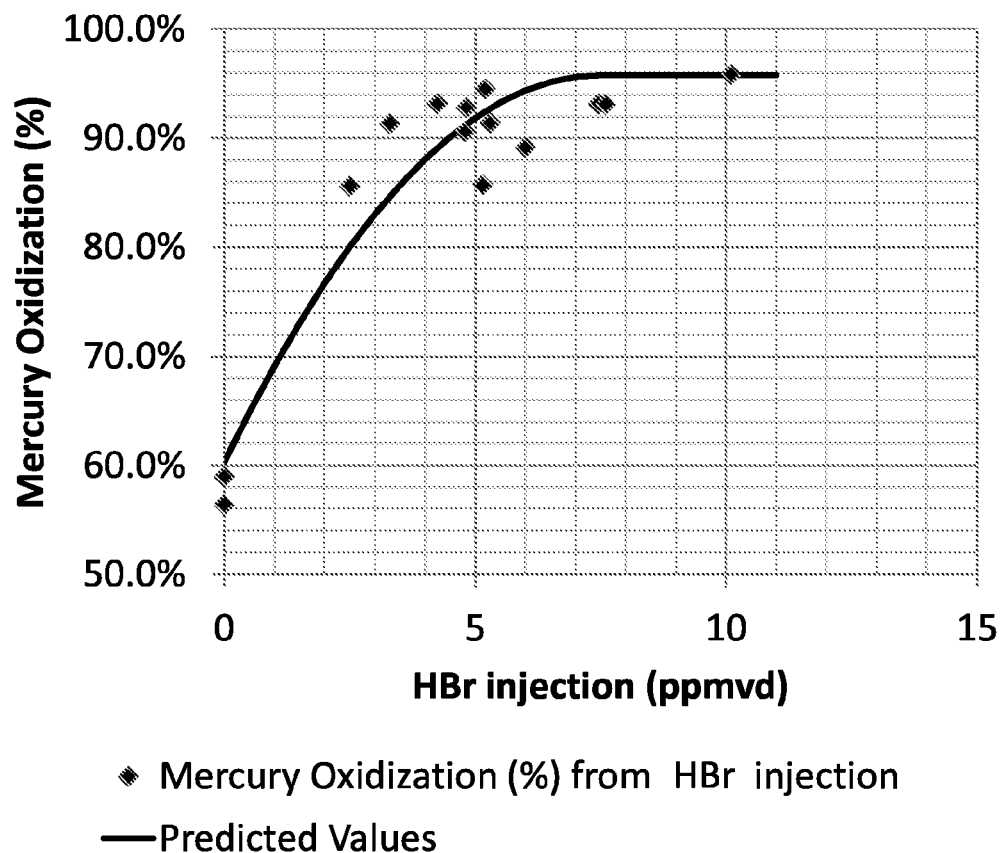
FIG. 8 is a plot of mercury oxidation against HBr injection rates from the testing of Example 2.

The test results showed over 90 percent oxidation when flue gas HBr concentrations were 6 ppmvd and higher, and when $SO_3$ was not being introduced to facilitate ESP operation. FIG. 8 plots percent mercury oxidation against the HBr oxidant concentration in the flue gas. Over the initial baseline runs, Hg emissions averaged 3.3 pounds per trillion British thermal units.

In the present example, the existing cold side electrostatic precipitator was used to control particulate emissions, and was found to be very effective in removing oxidized mercury from the flue gas. Testing results indicated high Hg removals (around 90 percent) when HBr was injected into the flue gas at concentrations above 6 ppmvd. Inlet mercury was calculated from coal analytical results, and stack mercury was analyzed using EPA Method 30B. Results from representative test runs are presented in Table 4.

TABLE 4

| Gross Unit Load (MW) | HBr Concentration in Flue Gas (ppmvd) | Inlet Mercury (lb/TBtu) [from coal] | Stack Mercury (lb/TBtu) | Hg Removal (%) |
|---|---|---|---|---|
| 329 | 0 | 6.8 | 3.2 | 52.9 |
| 329 | 0 | 6.8 | 3.4 | 50.0 |
| 342 | 2.5 | 6.25 | 1.08 | 82.7 |
| 342 | 3.3 | 6.25 | 0.73 | 88.4 |
| 204 | 4.9 | 5.78 | 0.74 | 87.2 |
| 204 | 5.3 | 5.78 | 0.34 | 94.1 |
| 338 | 10.1 | 9.73 | .65 | 93.3 |
| 299 | 12.9 | 6.53 | 0.73 | 88.8 |
| 299 | 13.6 | 6.53 | 0.65 | 90.0 |

Baseline testing was conducted while injecting $SO_3$ into the flue gas stream prior to the ESPs 2450 to enhance ESP performance. The $SO_3$ injection is used to significantly improve electrostatic precipitator performance with respect to particulate matter removal. During the trial, it was found that the $SO_3$ interfered with the performance of the HBr reagent. It was also discovered that when injecting HBr without $SO_3$ injection, $SO_3$ injection was not necessary and that both particulate matter and opacity control improved. The particulate test results suggest that the HBr could be used to replace the $SO_3$ for the purpose of enhancing ESP operation. All reported runs other than baseline were conducted without $SO_3$ injection. Results are presented in Table 5.

TABLE 5

| Gross Unit Load (MW) | HBr Injection Rate (ppmdv) | FPM (lb/MMBtu) | CPM (lb/MMBtu) | Total CPM (lb/MMBtu) | Opacity (%) |
|---|---|---|---|---|---|
| 329 | 0 (Base) | 0.08 | 0.153 | 0.233 | 23.9 |
| 329 | 0 (Base) | 0.071 | 0.109 | 0.180 | 23.7 |
| 342 | 2.5 | 0.053 | 0.088 | 0.141 | 21.8 |
| 342 | 3.3 | 0.071 | 0.140 | 0.211 | 20.8 |
| 346 | 4.8 | 0.06 | 0.125 | 0.185 | 21.0 |
| 345 | 5.3 | 0.045 | 0.126 | 0.171 | 20.4 |
| 317 | 7.5 | 0.059 | 0.148 | 0.207 | 16.2 |
| 299 | 13.2 | 0.037 | 0.088 | 0.125 | 14.3 |

*HBr Injection Rate represents HBr on a dry basis.

HBr injection was found to improve the control of flue gas filterable particulate matter (FPM) and condensable particulate matter (CPM). Based on parametric test results at various HBr injection rates at full load conditions, filterable particulate matter decreased 17 to 30 percent and CPM decreased 13 to 24 percent compared to baseline conditions. Total particulate matter, the sum of condensed particulate matter and filterable particulate matter, decreased 7 to 44 percent. HBr was injected at HBr injection point 2425. Powdered activated carbon was injected at injection point 2445.

Two runs were conducted with only PAC on days following the test program described above. The PAC dosing during the two runs was 10 lb/MMacf, with a two-run average 93.4 percent Hg removal achieved. HBr injection at 9.7 ppmdv, was combined with PAC injection at 2 lb/MMacf on the previous day, with a resulting Hg removal of 91.3 percent. These results suggest that HBr injection can reduce the amount of PAC required to achieve a given Hg removal.

Figure 9:
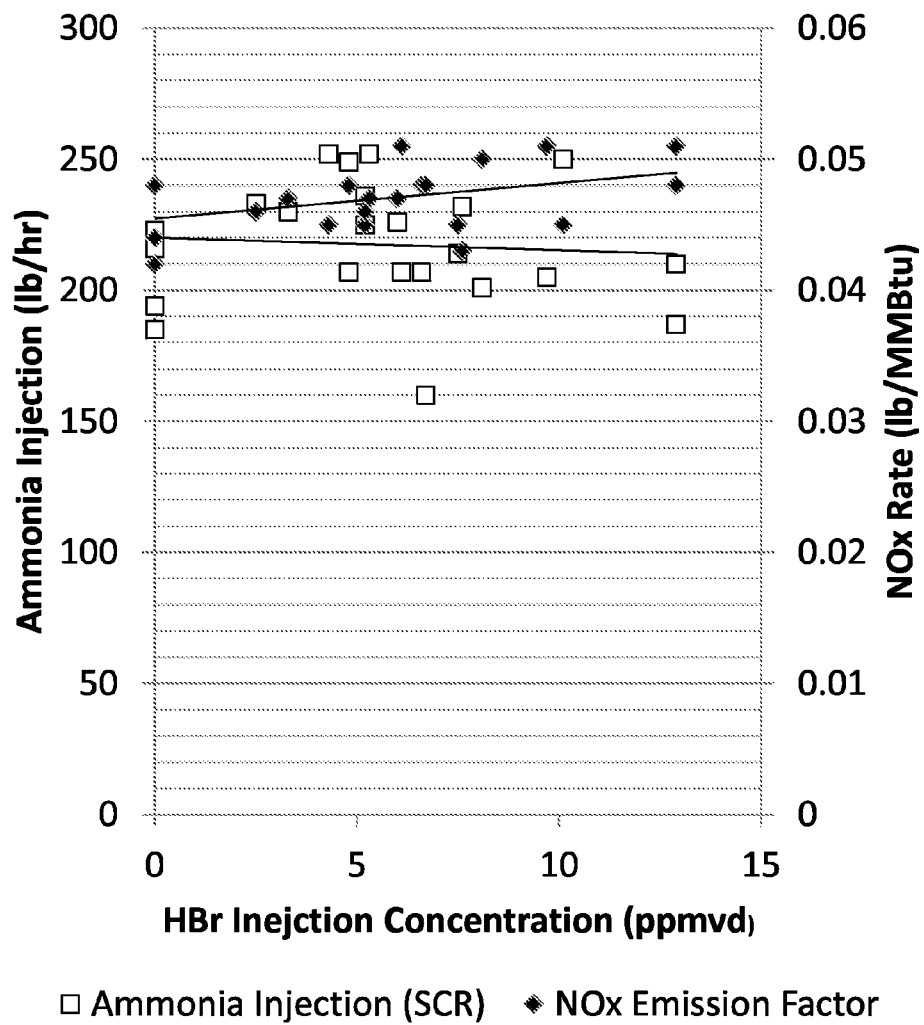
FIG. 9 is a plot of ammonia injection rate and the NOx emission factor against HBr injection concentration from Example 2.

HBr injection upstream of the SCR showed no significant adverse impact to SCR performance relative to NOx control. The average difference between baseline and the highest HBr injection dosing (13.2 ppmdv) indicated an 11 percent increase in NOx emissions. However, at an HBr injection rate of 6 ppmdv and less, which would be typical for long-term operation, the NOx emission factors were within the range of baseline values. The HBr injection lances were placed immediately upstream of the SCR unit in this test. Data was collected over an operating range of 315 to 348 MW gross, and the NOx emission factor during the test ranged between 0.042 and 0.051 lb/MMBtu. As shown in FIG. 9, the NOx emission factor (measured at the stack) shows a slight upward trend with increasing HBr concentration in the flue gas duct. Over this same range, the ammonia injection rate to the SCR shows a downward trend, which would explain some of the upward trend in the $NO_x$ emission factor.

Example 3

Figure 10:
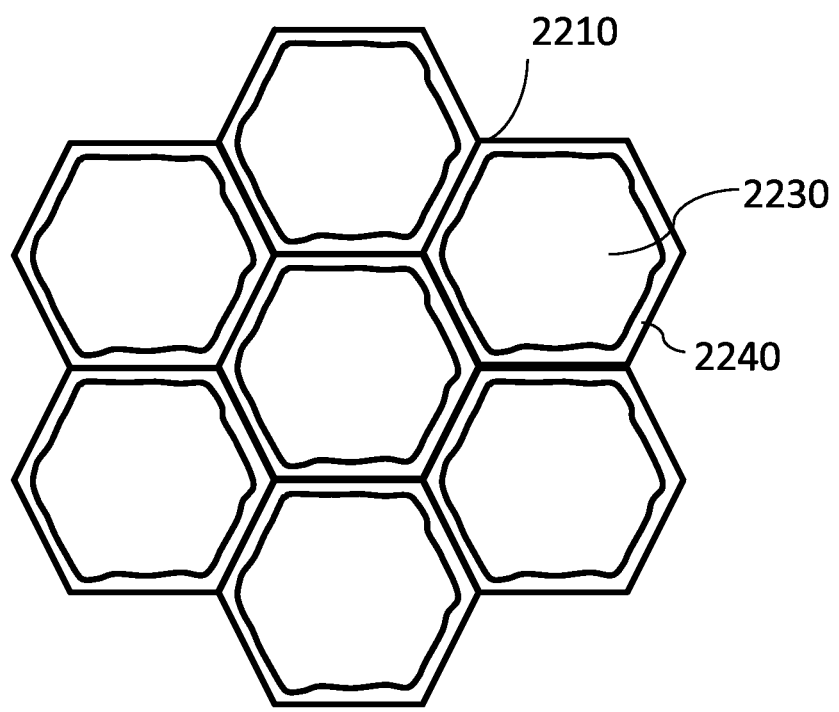
FIG. 10 is a view of the internal structure of an SCR coated with HBr treated ash.

A SCR is an air pollution control device used to control nitrogen oxide emissions. The technology employs a catalyst and typically either urea or ammonia that is injected into a flue gas duct ahead of the catalyst bed. As evidenced by Examples 1A-1E, injection of HBr upstream of an ESP does not adversely affect SCR performance, and has minimal impact on NOx control. The presence of an SCR has been shown to promote oxidation of Hg without HBr dosing. The promotion of additional Hg oxidation may be related to the large surface area of the SCR covered by ash that has been treated with HBr. Referring to FIG. 10, SCR catalyst internal structure 2010 may be in the form of a honeycomb or any other conventional configuration. Internal structure 2010 develops an ash coating 2240 such that the flue gas passing through SCR internal flow path 2230 has a great degree of contact with ash coating 2240.

Example 4

Figure 11:
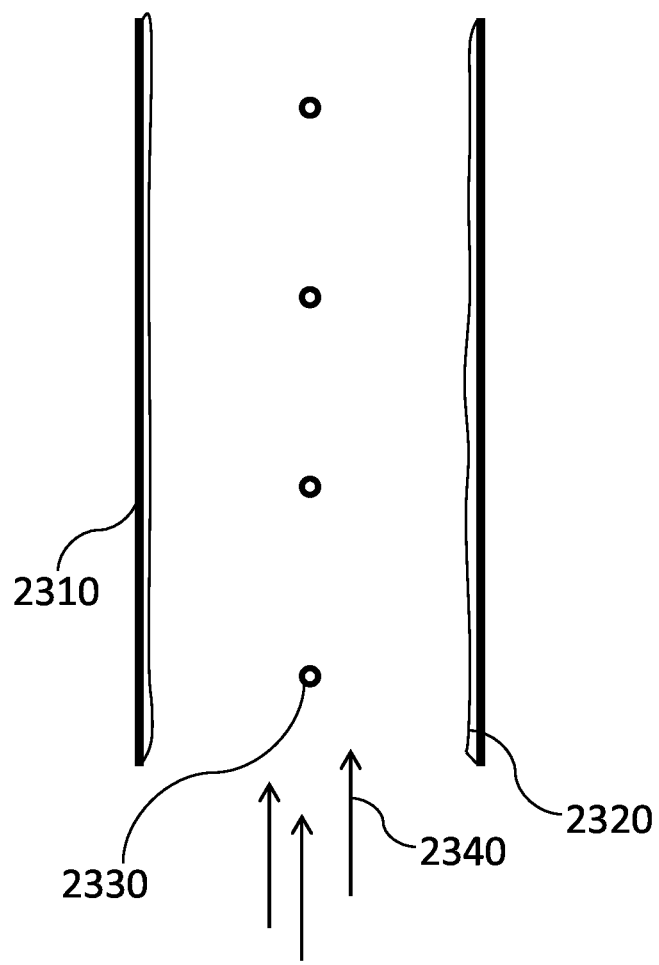
FIG. 11 is a view of the internal structure of an ESP coated with HBr treated ash.

FIG. 11 is an example of an ESP such as the ESP from Examples 1A-1E. In the present example, negatively charged electrode in the form of wire 2330 and positively charged electrode, plates 2310 create an electric field. The electric field between the electrodes drives particles in gas flow path 2340 to collect on plate 2310. HBr conditioned fly ash clinging to plates 2310 creates a high surface area reactive surface enhancing the effect of the HBr injection. Specifically, the device employs a charging section that imparts an electric charge, normally negative, to the particulate matter. The charged matter is attracted to an oppositely charged surface located perpendicular to the flow path. The ash collects on these surfaces and falls into a lower hopper where the ash can be removed.

When HBr is injected upstream of an ESP unit, it will associate with particulate matter as previously discussed. Ash and Hg(2+) will be collected together on the ESP plates. Not wishing to be bound by theory, HBr is believed to increase a particles effective charge, increasing collection efficiency. This intrinsic attraction associated with HBr creates the potential for a high concentration of HBr on the ESP plates and associated ash coating.

Example 5

Figure 12:
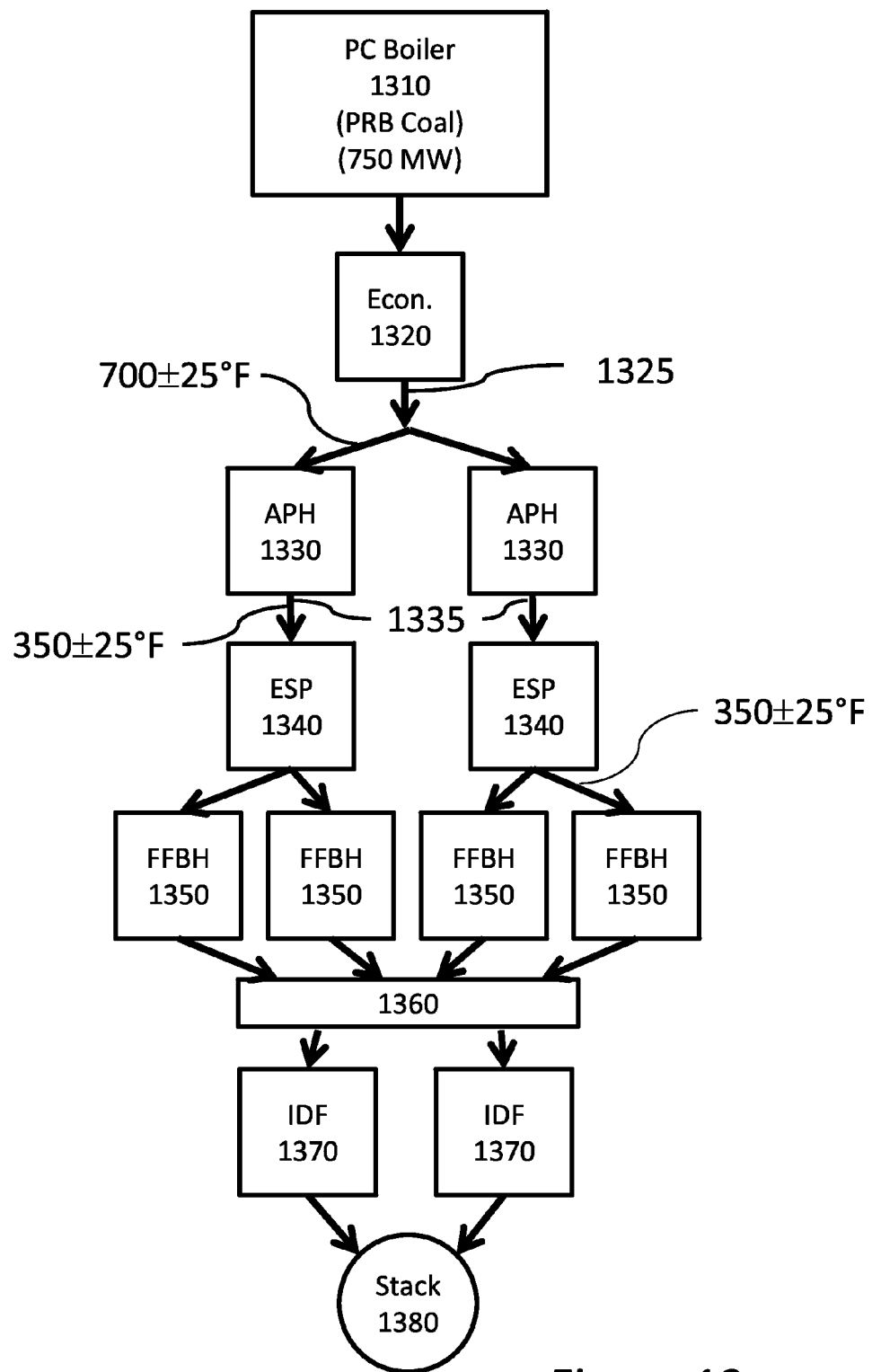
FIG. 12 represents the layout of the plant tested in Example 5.

Example 5 was conducted on a commercial scale power plant having the setup, coal characteristics, and pollution control equipment described in FIG. 12. Referring now to FIG. 12, flue gas from boiler 1310 enters economizer 1320 after which the line gas is divided into and treated in two separate trains. HBr injection point 1325 is located at the inlet of air preheaters 1330. Flue gas than passes through air preheater 1330, past activated carbon injection point 1335 and into electrostatic precipitators 1340. Each electrostatic precipitator 1340 is followed by a pair of fabric filter/bag houses 1350 and the filtered flue gas from fabric filter/bag houses 1350 is reunited in a single header 1360 before being pushed to stack 1380 by ID fans 1370.

The boiler 1310 of Example 5 is a PC boiler with an electric generation capacity of approximately 750 MW. This unit burns Texas lignite coal blended with powder river basin coal. The air pollution control system consists of a dry, "cold"-side electrostatic precipitator 1340 to control particulate and mercury associated with the activated carbon injection system at the ESP inlet A Compact COHPAC baghouse 1350 is operated downstream of the ESP 1340 for further PM control which also yields additional control of Hg emissions. FIG. 12 shows the system layout and the injection/testing locations. A dilute HBr solution was injected at the air preheater inlet. Each COHPAC module 1350 included a bypass valve, used to relieve excess bag filter pressure drop resulting in a portion of flue gas exiting to the stack unfiltered.

Two runs of baseline and eleven runs of HBr parametric testing were performed over a four day period to determine the impact on stack mercury (Hg) oxidization and removal. The unit load was observed to vary from 556 MW to 637 MW, and the untreated flue gas bypassing the COHPAC 1350 was calculated to fluctuate between 5.1% and 16.5%.

It is estimated that between 5% and 15% of untreated flue gas was routed to stack 1380 during testing.

Table 6 shows overall Hg removal results based on coal Hg content and Hg measured at the stack 1380. Assuming all Hg entering the combustor in coal is volatilized, then approximately 57% of all Hg remains as elemental Hg throughout the entire air pollution control train under baseline conditions. Approximately 40% of all Hg entering in coal is removed under baseline conditions. Mercury oxidation and removal levels resulting from HBr injections are also shown.

TABLE 6

| Run | Unit Load (MW) | HBr Dosing (ppmvd) | Inlet Hg (total) [lb/TBtu] | Stack Hg (total) | Total Removal (combined Fabric Filter and ESP) [Percent] |
|---|---|---|---|---|---|
| 1 | 635 | 0 | 19.79 | 11.11 | 43.9 |
| 2 | 635 | 0 | 19.79 | 12.85 | 35.1 |
| 3 | 637 | 7 | 28.69 | 9.45 | 67.1 |
| 4 | 556 | 7.8 | 27.9 | 4.12 | 85.2 |
| 5 | 557 | 5.6 | 27.94 | 1.8 | 93.6 |
| 6 | 562 | 1.7 | 23.43 | 11.06 | 52.8 |
| 7 | 563 | 3.7 | 23.4 | 8.54 | 63.5 |
| 8 | 562 | 6.2 | 23.39 | 3.12 | 86.7 |
| 9 | 635 | 7.1 | 24.95 | 5.49 | 78 |
| 10 | 632 | 5.8 | 24.95 | 6.88 | 72.4 |
| 11 | 632 | 6.7 | 25.09 | 5.61 | 77.6 |
| 12 | 636 | 6.5 | 28.93 | 3.59 | 87.6 |
| 13 | 637 | 7.2 | 28.89 | 2.92 | 89.9 |

FIG. 13 shows Hg oxidation results at the inlet to the COHPAC system 1350 and the stack 1380. A significant portion of Hg is oxidized and captured in fly ash by the ESP 1340. An additional amount of Hg is captured and removed by the COHPAC system 1350.

Figure 14:
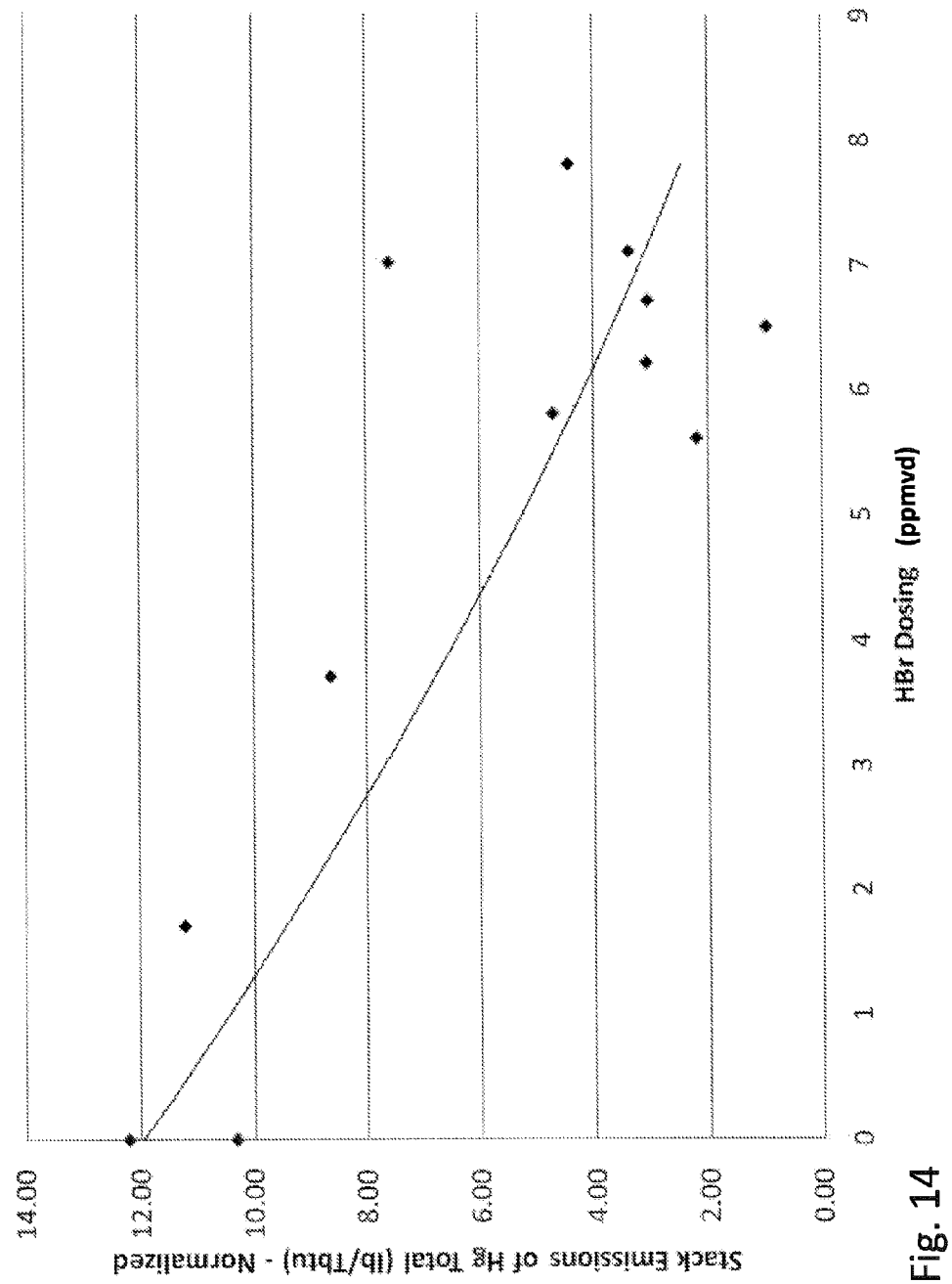
FIG. 14 is a plot of total mercury emissions against HBr dosing for the tests of Example 5.

FIG. 14 shows normalized stack total Hg emission rates, normalized to remove the effect of flue gas bypassing the COHPAC system 1350. In other words, the corrected BgT emission rate is the estimated rate had there been no flue gas bypass. In addition, it is observed that conditioning of large air pollution control systems handling large amounts of fly ash (e.g., high lignite coal fly ash content) require conditioning time with HBr injection before final stable Hg emission rates are achieved. A strong correlation was observed between the amount of HBr injected prior to each run and the mercury removed or oxidized. This is attributed to the system slowly building up to an equilibrium content of HBr laden fly ash in the system.

At 6.5 ppmvd injection concentration, the Hg oxidization efficiency is 85.8% (normalized) as compared to baseline conditions.

Figure 15:
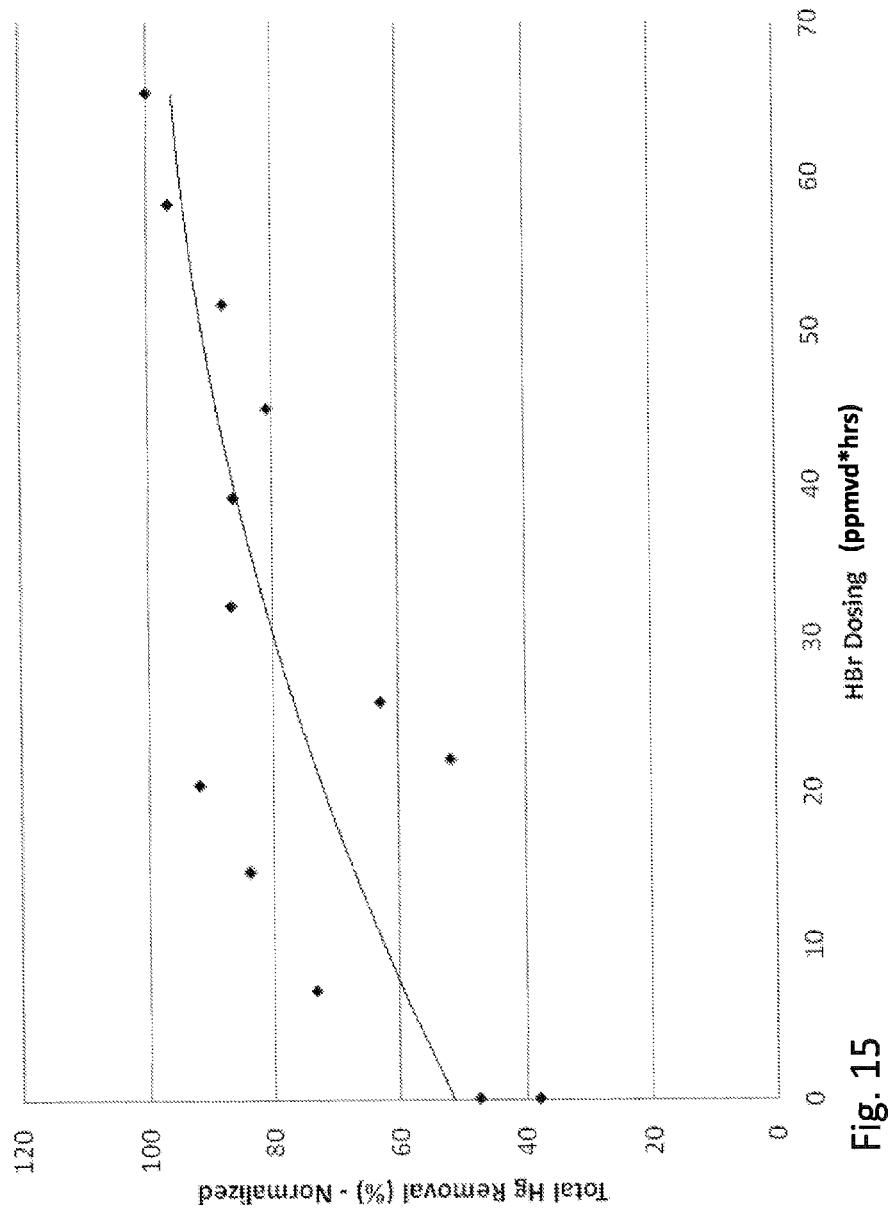
FIG. 15 is a plot of total mercury removal against cumulative HBr dosing for the tests of Example 5.
Figure 16:
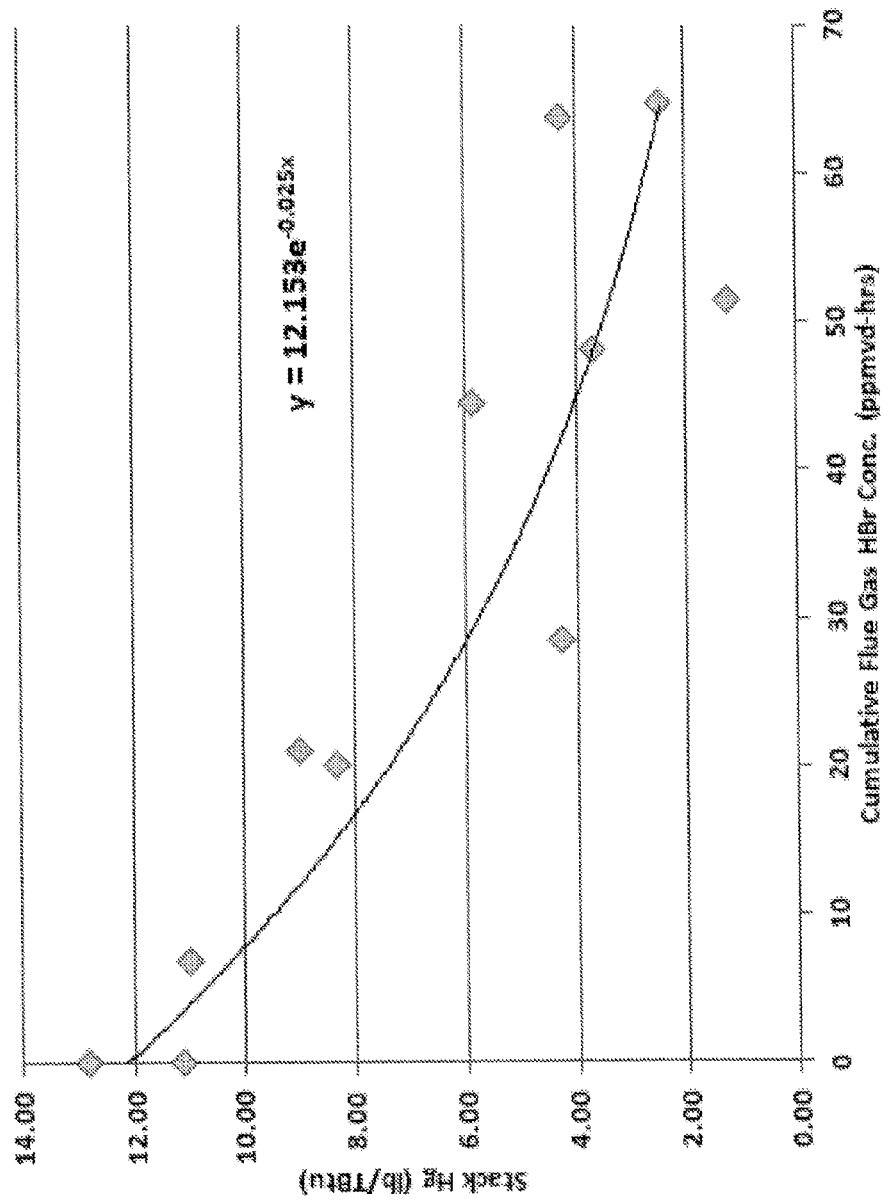
FIG. 16 is a plot of stack mercury concentrations versus cumulative HBr dosing for the tests of Example 5.

At the 6.5 ppmvd HBr injection concentration, resulting stack Hg concentration was approximately 4.4 lb/TBtu (un-normalized) because a portion of the flue gas bypassed the COHPAC, with a normalized value of 3.7 lb/TBtu. FIG. 15 shows normalized total Hg removal efficiency plotted against the cumulative HBr dosing over the test program. FIG. 16 shows normalized total Hg in the stack (pounds per trillion British thermal units) plotted against the cumulative HBr dosing over the test program. As used in herein, cumulative dosing is presented as ppmvd*hrs which is calculated as the area under a dosing curve that plots ppmvd dosing of HBr against injection time measured in hours.

Example 6

Fabric Filter/Bag House

Figure 17:
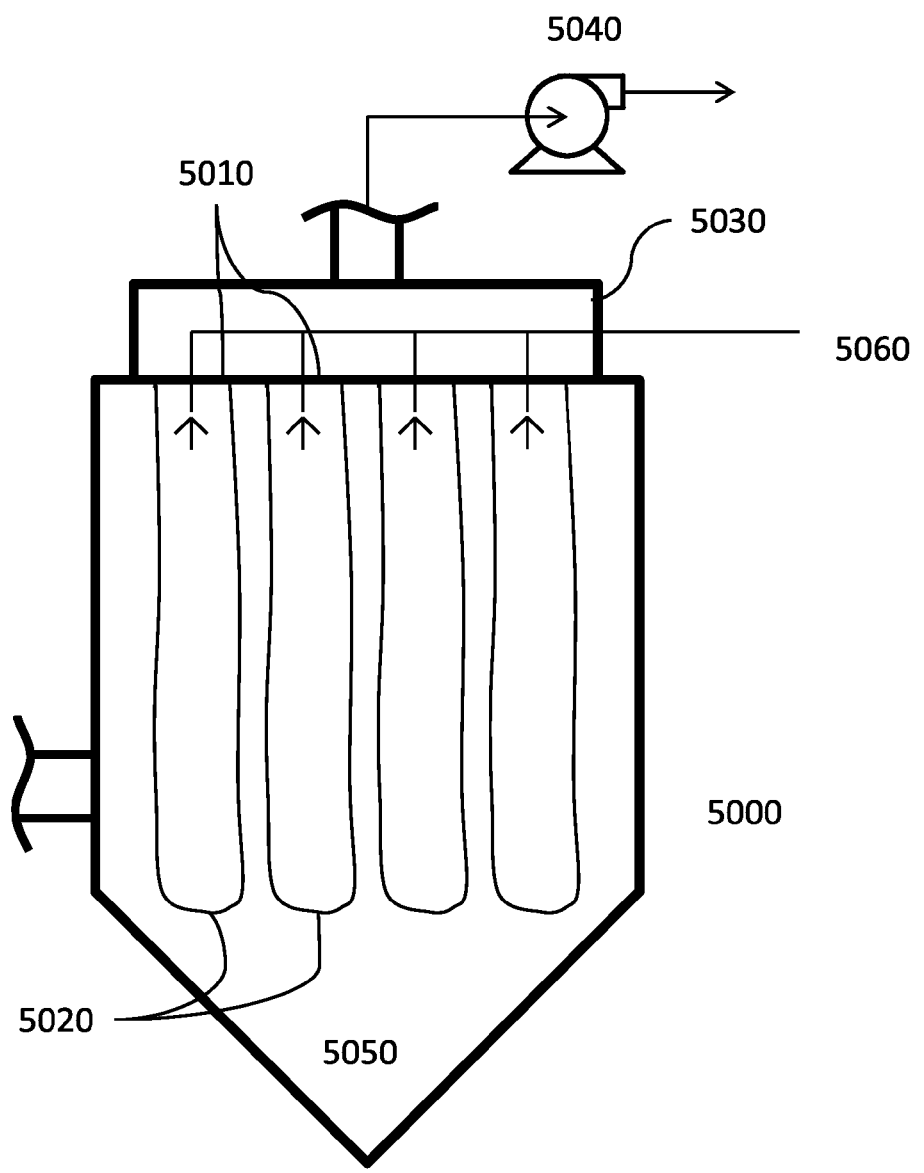
FIG. 17 is a drawing of the baghouse described in Example 6.
Figure 18:
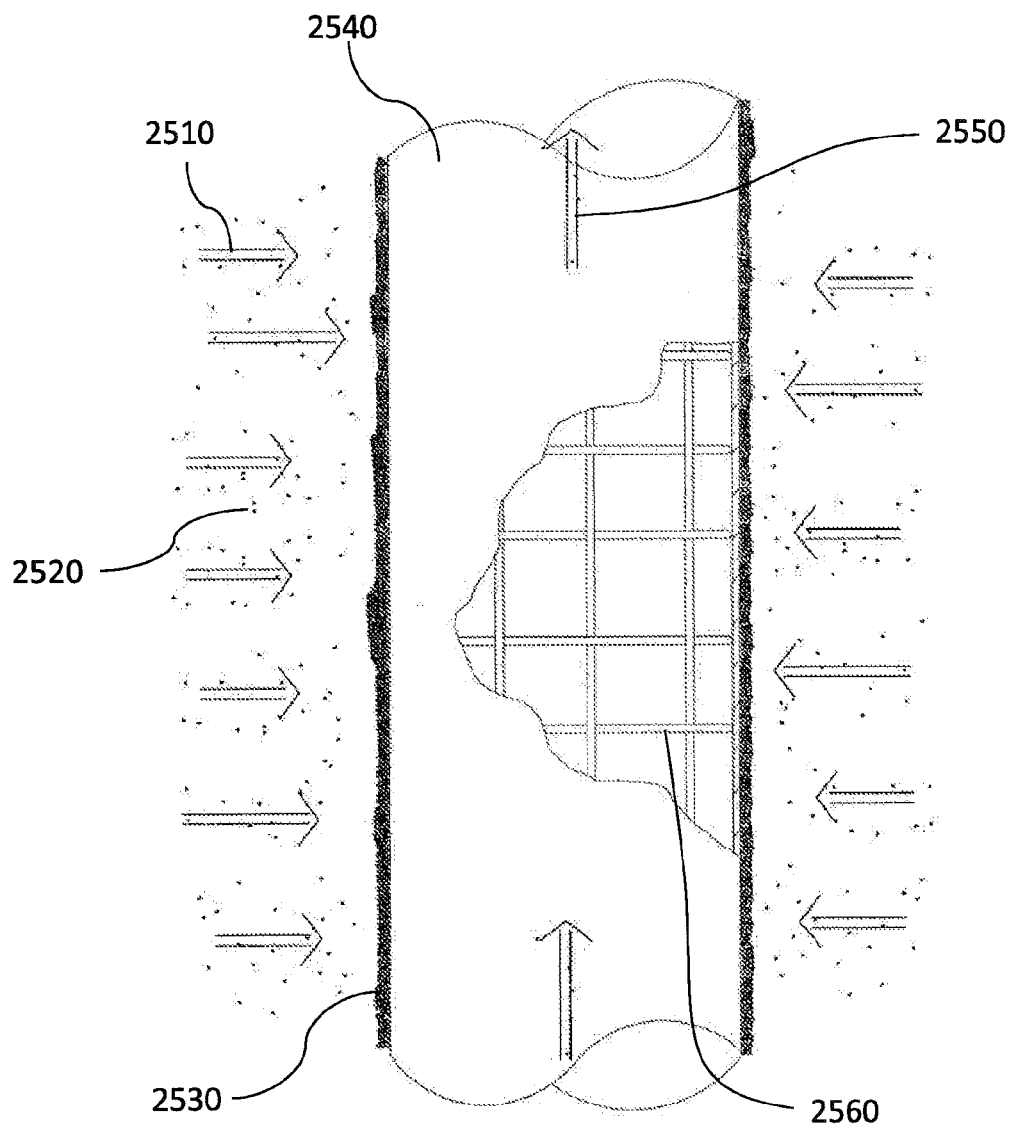
FIG. 18 is a drawing of the internals of the baghouse described in Example 6.

A fabric filter baghouse is an air pollution control device used to remove particulate matter such as ash from a flue gas stream, such as in the configuration described in Example 5. Referring now to FIG. 17, atypical baghouse consists of an outer sealed enclosure 5000. A group of holes 5010 is placed in the top of the enclosure into which porous fabric filters, typically referred to as bags 5020, are placed. The bags 5020 are constructed of a porous media such as felt or other semi-porous material that will allow air flow through the bags 5020 while collecting particulate on the outer bag surfaces. A common plenum 5030 is placed across the top of the baghouse to collect clean air that flows through the bags. Bags 5020 extend into the enclosure to a depth that maximizes ash collection surface area. A device such as a fan 5040 provides the motive force to move particulate laden gas into the baghouse through an inlet duct opening. Particulate matter that accumulates on the outer bag 5020 surface is constantly renewed through bag cleaning, causing the ash to fall into a lower chamber 5050 of the baghouse where it can be collected and removed from the baghouse. This cleaning is commonly performed by periodic bag pulsing with an air jet 5060 that creates a temporary reverse flow through selected bags. Referring now to FIG. 18, which shows the configuration of an individual bag 2540 from a baghouse, bag 2540 is wrapped around a wire frame 2560. Flue gas travels in the direction of flow indicated by arrow 2510 through bag 2540 and ultimately up though the inside of bag 2540 as indicated by flow direction arrow 2550. As this process occurs, solid particles, namely fly ash particles 2520, form a particulate layer 2530.

HBr in the flue gas attaches to ash providing a reaction site for the Hg in addition to that which occurs in the gas phase between the injected HBr and Hg. This particulate matter reaction site effect can occur in the gas flow stream on individual ash particles in the gas stream, at the duet walls (ash cake), on the particulate layer on fabric filter bags, or wherever particulate matter is present on a surface exposed to HBr dosing. As shown in FIG. 18, HBr treated fly ash having a bromine concentration representative of one or more of the examples described herein attaches to particulate layer 2530 forming an ash cake. The ash cake continuously builds as more HBr treated fly ash is filtered by bag 2540. As flue gas containing mercury passes through the ash cake, a substantial fraction of mercury in the flue gas attaches to the ash cake. When bag 2540 is pulsed mercury laden fly ash is dropped from bag 2540 and removed from the baghouse. As the system cycles, fresh HBr treated fly ash is always being added to bag 2540 and mercury is being continuously removed by the ash cake with mercury laden fly ash being periodically removed by baghouse cleaning. The fabric filter provides a large surface area for contact between the bromine containing ash and the gas stream. Not wishing to be bound by theory, the Hg(0), as it comes in contact with the active bromine species associated with the ash on the outer hag surface may react to form Hg($2^+$), which is removed, from the flue gas along with the particulate matter collected on the bags.

Example 7

Figure 19:
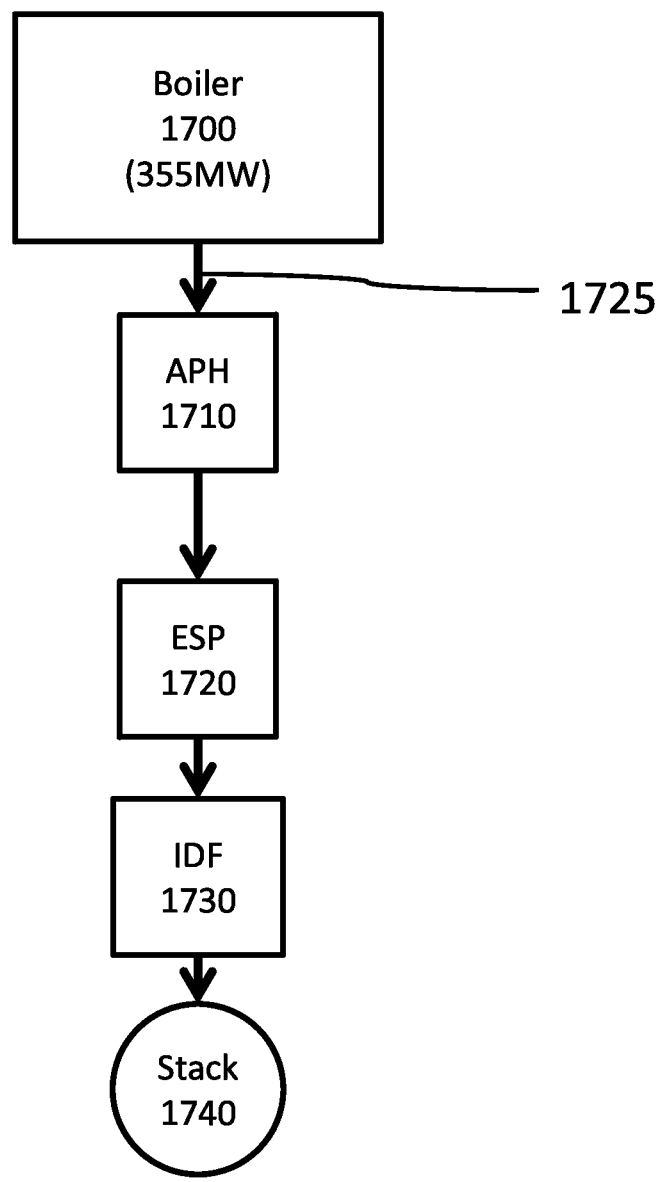
FIG. 19 represents the layout of the plant tested in Example 7.

Testing was conducted at a coal-fired, front-wall-fired utility boiler with an input duty rating of approximately 355 MW, gross shown in FIG. 19. Flue gas from boiler 1700 flows into air preheater 1710 then through electrostatic precipitator 1720 and is ultimately fed through ID fan 1730 into stack 1740 where it is released to the atmosphere. HBr injections during the test occurred at injection point 1725 between boiler 1700 and air preheater 1710. The test program was designed to evaluate the degree of oxidation associated with HBr injection and to evaluate removal in an ESP.

Figure 20:
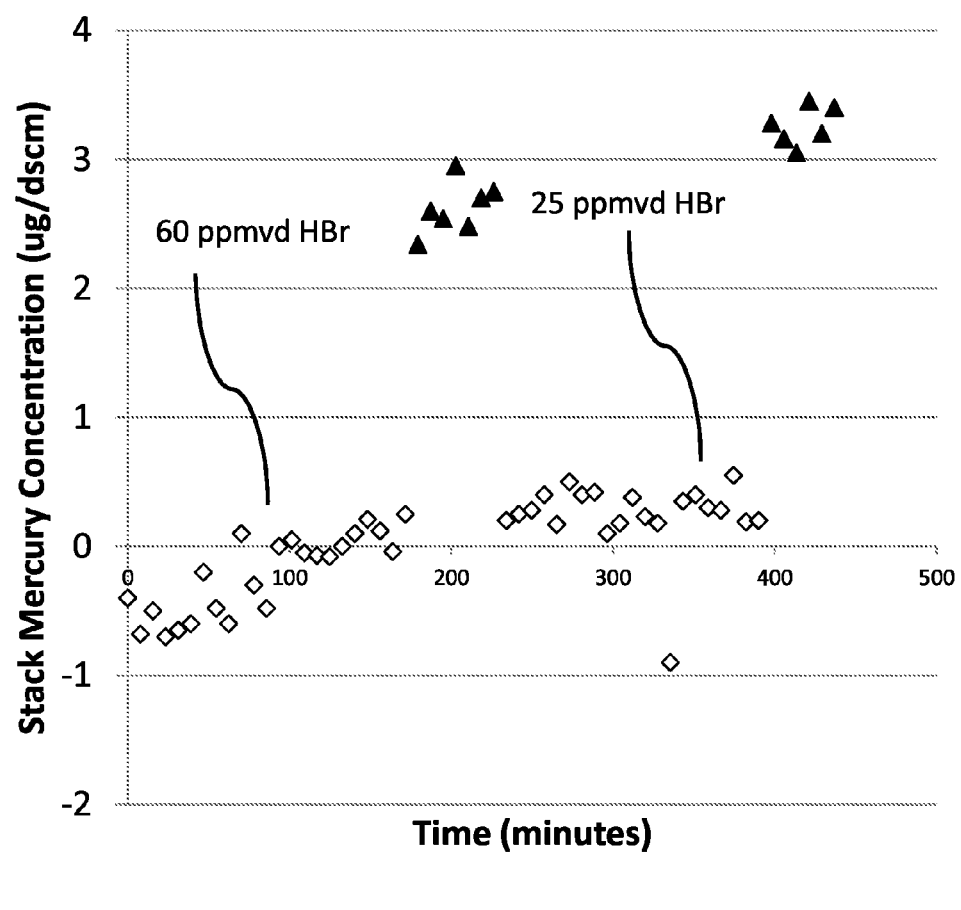
FIG. 20 is a plot of stack mercury concentrations during the tests of Example 7.

The effectiveness of HBr in oxidizing Hg(0) in the present example is demonstrated in the data shown in FIG. 20 which was collected from a Hg continuous emissions monitor with the sample extracted from the stack. During periods when HBr was sot being injected, Hg ranged from about 2.3 to 3.4 micrograms per dry standard cubic meter (μg/dscm). The initial HBr injection period represents a flue gas HBr concentration of 60 ppmvd, and the second set represents a flue gas HBr injection concentration of 25 ppmvd.

Example 8

A 800 MW coal fired power plant was tested to evaluate HBr performance. Testing was conducted at loads that fluctuated between 747 and 836 MW. The coal fired during the test consisted of approximately 90 percent lignite coal and 10 percent PRB coal. The air pollution control train included a PC Boiler, SCR, air preheater, cold side ESP, ID fan, WFGD, and stack. The air pollution control system also included a PAC system for Hg treatment. The PAC injection was turned off during HBr testing. During this test, HBr was injected at the SCR inlet at a temperature of approximately 850° F. Baseline HgT was 51.1 lb/TBtu based on coal measurements. Baseline HgT as measured at the WFGD inlet was 14.7 lb/TBtu and 35.8 percent oxidized. These results show that 71.2 percent of the Hg was removed in the ESP prior to the WFGD inlet. Under baseline conditions, the WFGD Hg removal efficiency was 39.7 percent, with a system Hg removal of 82.7 percent. Over the period of HBr injection and associated testing, the HBr injection dose averaged 9.9 ppmvd, with an average system HgT removal efficiency of 90.2 percent over the air pollution control system. Over the period of injection, stack gas opacity averaged 10.1 percent compared to baseline of 13.1 percent.

Example 9

A 650 MW lignite coal fired power plant was tested to evaluate HBr performance. Testing was conducted at loads that fluctuated between 472 and 538 MW. In comparison to bituminous or sub-bituminous coal, lignite coal is a low rank coal generally containing a low energy content with higher levels of mercury, metals, moisture, and ash content. The air pollution control train included a PC Boiler, SCR, air preheater, cold side ESP, ID fan, WFGD, and stack. The air pollution control system also included a PAC system for Hg treatment. The PAC injection was turned off during HBr testing. During this test, HBr was injected at the SCR inlet at a temperature of approximately 850° F. Baseline HgT was 31.5 lb/TBtu based on coal measurements. Baseline-HgT as measured at the WFGD inlet was 33.69 lb/TBtu and 5.8 percent oxidized. Under baseline conditions, the WFGD was removing 69.5 percent of the mercury, with a system Hg removal of 66.9 percent. Over the period, of HBr injection and associated testing, the HBr injection dose averaged 13.3 ppmvd, with an average system Hg removal efficiency of 87.4 percent across the air pollution control system. Over the period of injection, stack gas opacity averaged 8.3 percent compared to baseline at 10.6 percent.

Example 10

A steam boiler was tested to evaluate HBr injection. The air pollution control train associated with this boiler included a SNCR, dust hopper, air pre-heater, and FFBH. In this test, HBr was injected at the boiler outlet with Trona injected at the APH inlet. Testing with simultaneous Trona and HBr injection, or HBr alone, demonstrated Hg oxidation significantly lower than other comparable examples. At a 3 ppmvd dosing, Hg oxidation was 30.8 percent, and at 20 ppmvd dosing, Hg oxidation was 45.3 percent. This test demonstrated the importance of proper HBr distribution in the flue gas, since thus test was conducted at a very high injection nozzle turndown. This conclusion was reached based a comparison to the superior mercury removal results from a second similar unit described as Example 11.

Example 11

A steam boiler firing high fusion coal was tested to evaluate HBr injection. The air pollution control train associated with this boiler included a SNCR, dust hopper, air pre-heater, and FFBH. Stack HgT readings prior to HBr injection were 0.3 lb/TBtu and at the conclusion of the injection period (2 hr) were 0.05 lb/TBtu, and continued to drop after injection stopped. This test demonstrates that HBr is effective for low Hg concentration sources.

Example 12

An evaluation of HBr injection was conducted at an ethanol. production facility firing PRB coal to a 22 MW stream boiler. Air pollution control equipment included SNCR for NOx reduction. Trona injection for $SO_2$ control, and a FFBH for particulate control. The combustion train included the boiler, a heat recovery steam generator, four-stage evaporator (heat exchangers), economizer, and FFBH. During the test, ammonia associated with the SNCR was injected in the boiler, HBr was injected after the second evaporator stage at a flue gas temperature of 593° C., and Trona was injected before the economizer, about 35 feet downstream from the HBr injection point.

During the test baseline run conducted at a boiler steam load of 150,000 lb/hr, HgT emissions at the stack were 5.63 lb/Tbtu, with 11.7 percent oxidized with no Trona injection. With Trona injection, the baseline HgT emissions were 5.52 lb/Tbtu, with 9 percent oxidized. HBr was injected at rates sufficient to cause concentrations ranging from 5 to 21 ppmvd. At the average test HBr concentration of 9.38 ppmvd, an average of 51.6 percent oxidation was achieved, with a stack HgT emission average of 3.19 lb/TBtu. During the HBr injection HgT emissions decreased by an average of 42.2 percent, as compared to the average baseline concentration.

Example 13

Figure 21:
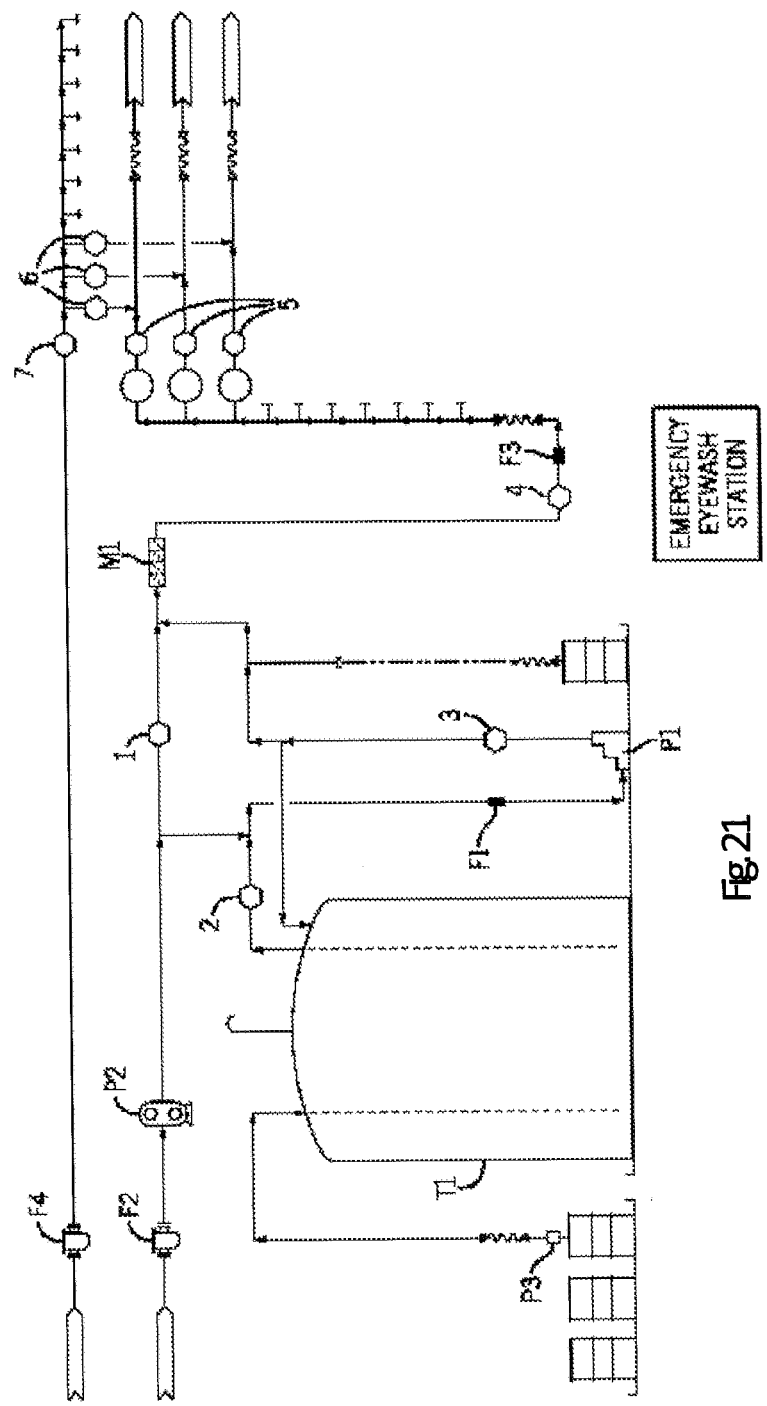
FIG. 21 depicts elements of an HBr supply system described in Example 13.

Referring now to FIG. 21 of the drawings, HBr is loaded from 55 gallon drums by HBr drum pump, P3 into 48% HBr day tank, T1. Water passes through water filter F2 and is pumped by water gear pump P2 into dilution water supply line 1. HBr solution line 2 conveys aqueous HBr through 48% HBr filter, F1 to HBr metering pump P1 which in turn supplies HBr to mixer line 3. HBr to mixer line 3 and dilution water supply line 1 join prior to static mixer M1. Flow from static mixer M1 travels through HBr solution filter F3 in line 4 where the flow is divided into a series of 10 lines, lance lines 5, that feed lances that distribute the aqueous HBr into the process. Air is fed through air filter F4 into atomizing air supply line 7 which supplies air to atomizing air distribution lines 6. Individual members of atomizing air distribution lines 6 combine with individual members of lance lines 5 to supply both air and HBr solution to the nozzles of the lances such that the individual nozzles are each supplied by one lance line 5 containing HBr solution and one atomizing air distribution line 6.

Example 14

Figure 22:
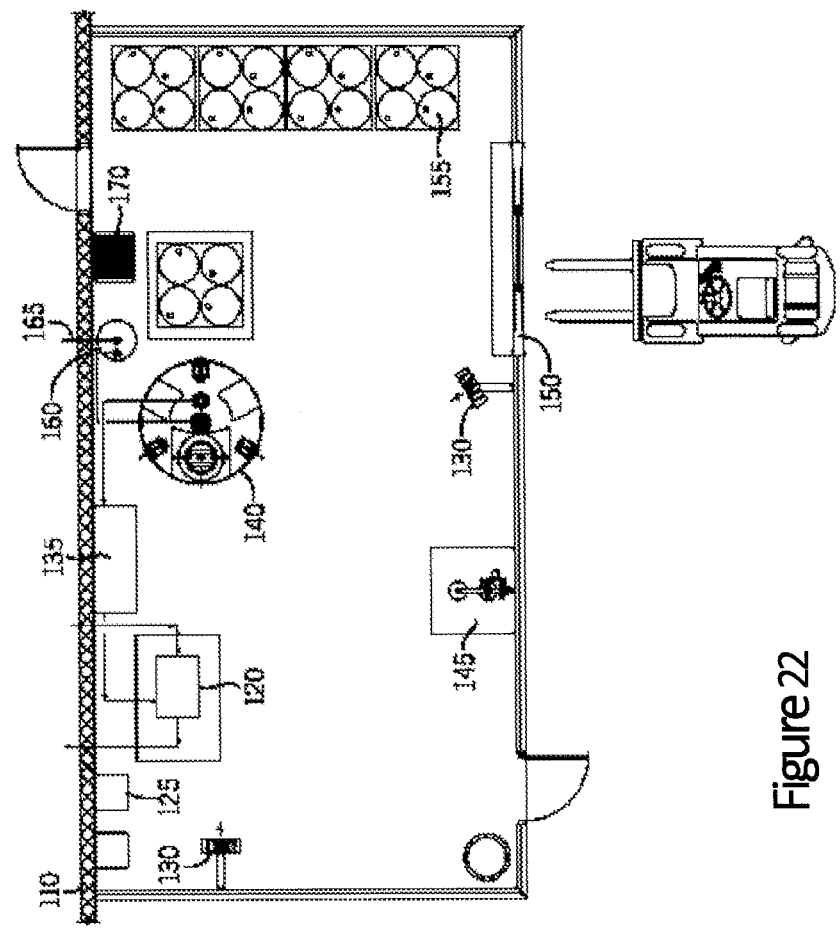
FIG. 22 depicts an operational layout for elements of an HBr supply system.

FIG. 22 represents an example of a layout that may be used in the practice of the various embodiments disclosed herein. Components of the layout depicted in FIG. 22 include existing building wall 110, water mixing skid 120, titration area 125, heaters 130, HBr pump panel 135, HBr storage tank 140, safety shower/eyewash station 145, roll up door 150, HBr drum storage 155, scrubber 160, scrubber vent 165, and sump area with sump pump 170.

Example 15

Figure 23:
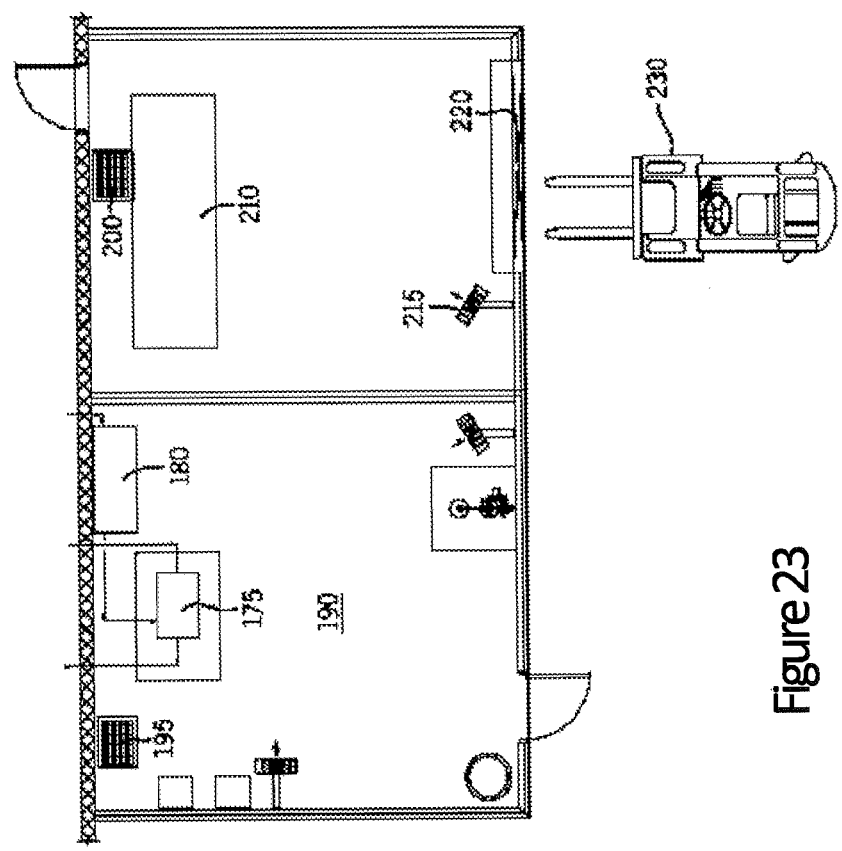
FIG. 23 depicts an operational layout for elements of an HBr supply system.

Components of the layout depicted in FIG. 23 include water mixing skid 175, HBr pump panel 180, chemical mixing room 190, sump area with sump pump 195, sump area with sump pump 200, air compressor on air compressor skid 210, heater 215, roll up door 220, and forklift 230.

Example 16

Figure 24:
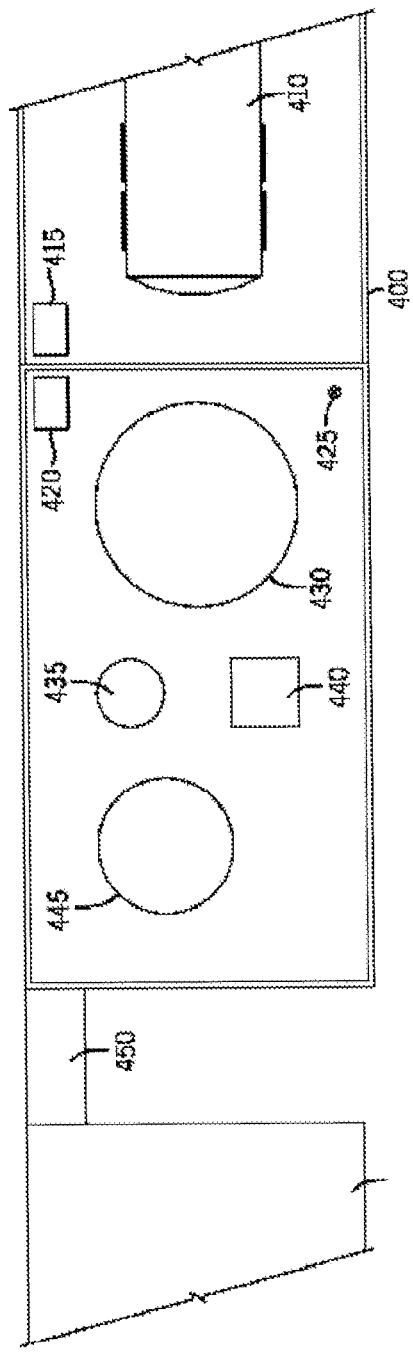
FIG. 24 depicts an operational layout for elements of an HBr supply system.

FIG. 24 represents an example of a layout that may be used in the practice of the various embodiments disclosed herein. Components of the layout depicted in FIG. 24 include containment wall 400, tanker truck 410, sump area and sump pump 415, sump area and sump pump 420, safety shower 425, HBr storage tank 430, scrubber 435, pump skid 440, blow down tank 445, pipe rack 450, and building 455.

Example 17

Figure 25A:
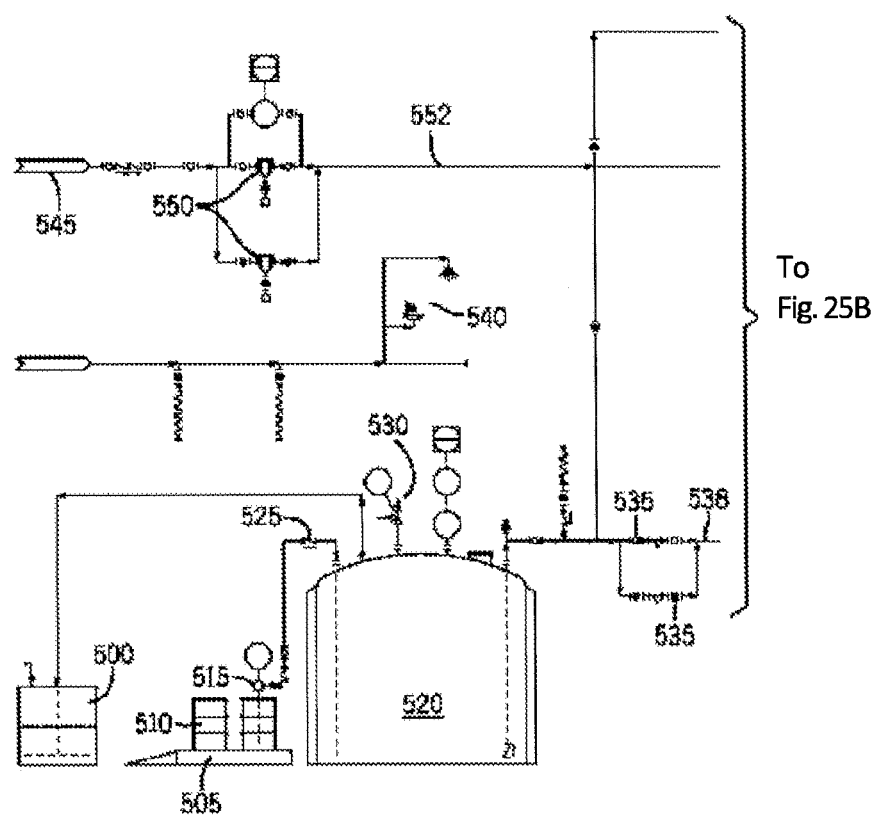
FIGS. 25A and 25B depict an operational layout for elements of an HBr supply system.
Figure 25B:
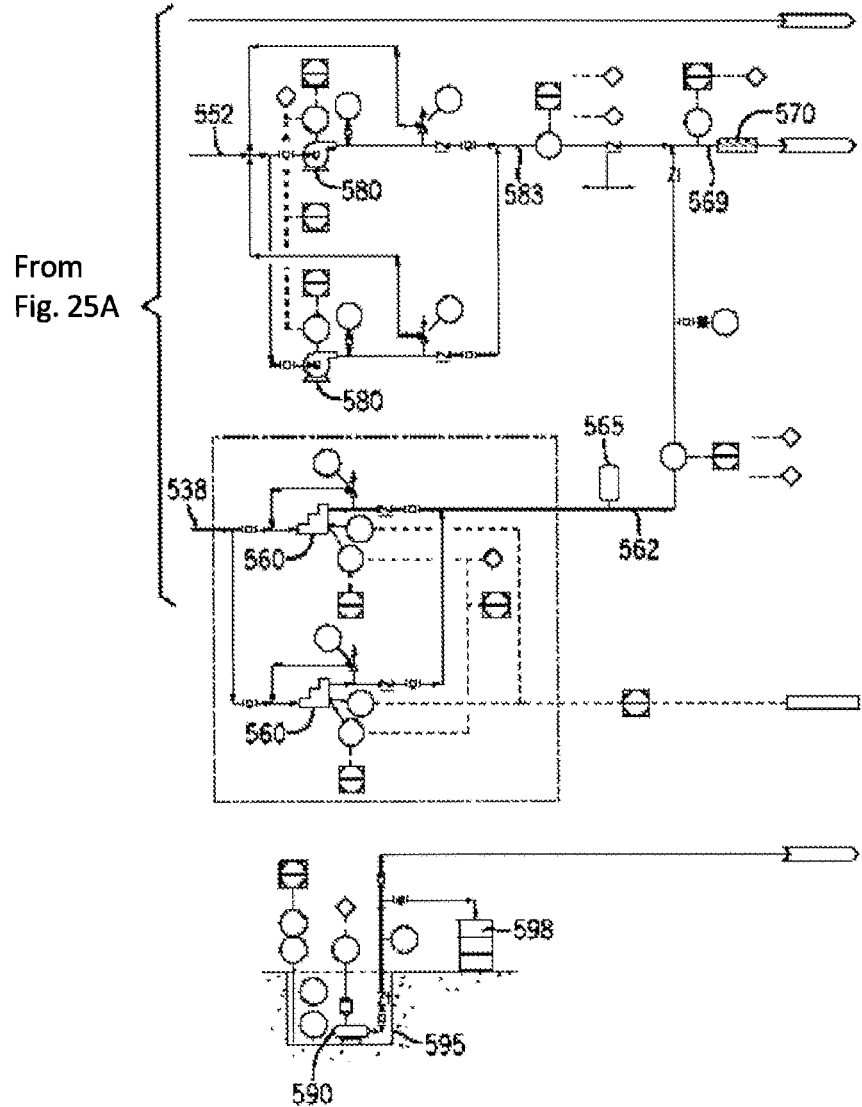

FIGS. 25A and 25B represent an example of a process layout that may be used in the practice of the various embodiments disclosed herein. HBr scrubber 500 removes HBr from vapors associated with HBr storage tank 520. HBr drums 510 are located in drum containment area 505. HBr drums 510 are unloaded by HBr drum pump 515 with the HBr passing through check valve 525 and into HBr storage tank 520. Pressure relief valve 530 protects HBr storage tank 520 from over pressure. HBr delivery from HBr storage tank 520 is accomplished by passing HBr through strainers 535 and into acid metering pump feed line 538. HBr from acid metering pump feed line 538 is optionally routed to one of two HBr metering pumps 560 which pump metered amounts of HBr into HBr feed line 562. HBr feed line 562 contains pulse damper 565. Clean water supply line 545 is filtered and/or strained by deal basket water filters 550 and supplies clean water by way of water supply line 552. Water supply line 552 optionally feeds one of two water pumps 580 which delivers water by way of water delivery line 583. HBr feed line 562 mixes HBr with the water from water delivery line 583 in mixing line 509. The aqueous solution of HBr contained in mixing line 569 is more completely mixed in in-line mixer 570. The aqueous solution of HBr is then delivered to the nozzles for addition to the flue gas. The HBr metering pumps may optionally be included within a panel or other enclosure. Portions of the process may drain to a sump 595 containing sump pump 590. Sump pump 590 optionally delivers waste from the sump to a waste storage container 598, or to a waste processing or recovery area.

Example 18

Figure 26:
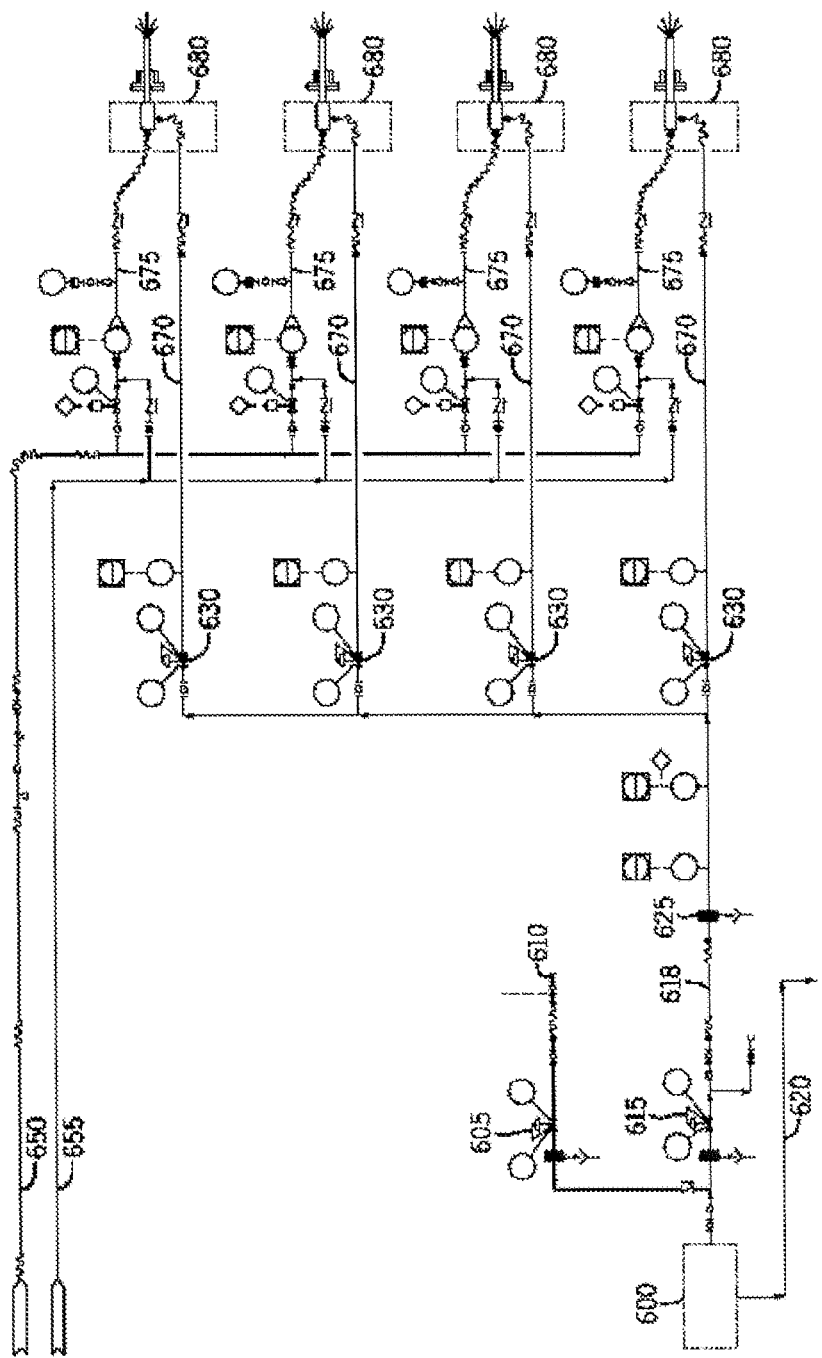
FIG. 26 depicts a configuration for a HBr distribution system.

FIG. 26 represents an embodiment in which HBr and air are supplied to nozzles tor injection into a flue gas. Compressed air is delivered to the nozzles through main compressed air line 618. The pressure in main compressed air line 618 is controlled by pressure control valve 615. Air is supplied to main compressed air line 618 by either air compressor 600 or an alternate source of compressed air 610 which may optionally be pressure controlled by pressure control valve 605. Condensate is drained from air compressor 600 by way of condensate drain line 620 and condensate is drained from main compressed air line 618 by way of separator and condensate drain line 625. Main compressed air line 618 branches into as many separate lines as are needed to feed a number of nozzles sufficient to adequately distribute an HBr solution into the flue gas. Individual pressure control valves 630 regulate the air pressure delivered to individual nozzles by way of individual nozzles air feed lines 670. Metered amounts of HBr are supplied to the nozzles by way of main HBr supply line 650 and flush water is delivered to the lances by flush water delivery line 655. HBr solution and air are mixed in the atomizer nozzle assemblies 680 with individual nozzle air feed lines 670 providing air to the nozzles and individual HBr nozzle supply lines providing HBr solution to the nozzles.

Example 19

Figure 27:
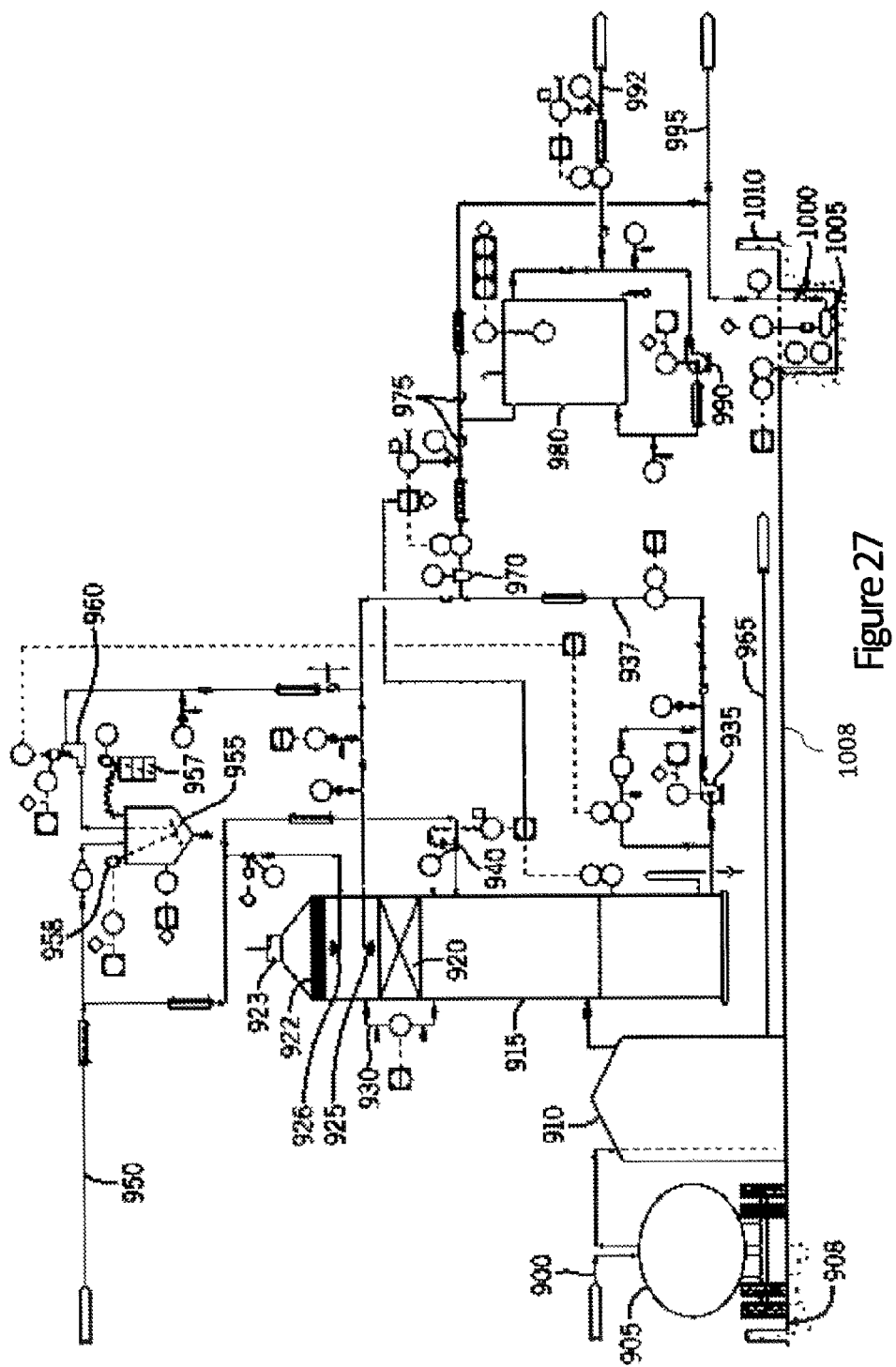
FIG. 27 depicts configuration for handling HBr and HBr deliveries.

FIG. 27 represents a commercial scale embodiment having truck unloading, storage, and a system for handling HBr vapors. In that embodiment, HBr truck unloading station 908 unloads HBr truck 905 utilizing nitrogen supply 900 into HBr storage tank 910. HBr is supplied to the aqueous HBr injection portion of the process from the HBr storage tank 910 by way of HBr supply line 965. Vapors from HBr storage tank 910 and optionally other acidic vapors needing treatment are delivered to acid scrubber 915. Acid scrubber 915 includes scrubber fill 920, mist eliminator pad 922, scrubber vent 923, spray nozzles 925 and 926, and differential pressure monitor 930. The contents of the scrubber are recirculated via scrubber recirculation pump 935 which feeds scrubber recirculation line 937. The scrubber recirculation line 937 in turn feeds nozzle 925. Utility water supply 950 supplies water to both caustic storage tank 955 and nozzle 926. Caustic storage tank 955 receives caustic from caustic drum 957. Scrubbing solution is provided to acid scrubber 915 from caustic storage tank 955 by way of caustic metering pump 960. Cartridge filter 970 filters blowdown from acid scrubber 915 when the blowdown is in route to blowdown storage tank 980. The containment area 1008 is surrounded by containment wall 1010 which drains to sump 1000 which is emptied by sump pump 1005. Material from sump 1000 and blowdown from acid scrubber 915 each enter blowdown storage tank 980 after passing through their respective check valves 975. Material from blowdown storage tank 980 is both recirculated and delivered to the line to the sanitary sewer 992 by blowdown discharge pump 990. Sump pump 1005 also discharges to line to storm drain 995.

Example 20

Injection Nozzles

Figure 28:
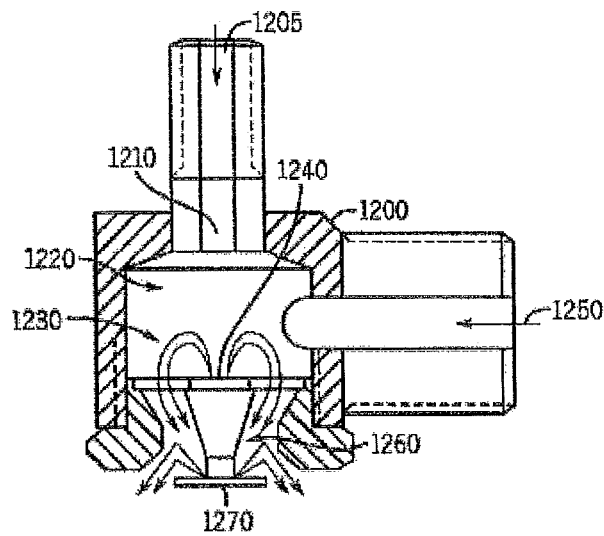
FIG. 28 depicts a dual fluid nozzle.

FIG. 28 represents a drawing of an embodiment of the aqueous HBr injection nozzle. Aqueous HBr solution enters the nozzle 1200 through liquid inlet 1205. HBr solution is injected into air/liquid mixing chamber 1220 at the point of liquid injection into the chamber 1210. Air is introduced at air inlet 1250 and the region of air/liquid mixing is designated in the figure by 1230. Sheer region 1260 and pintle plate 1270 of nozzle 1200 enhance atomization.

Figure 29:
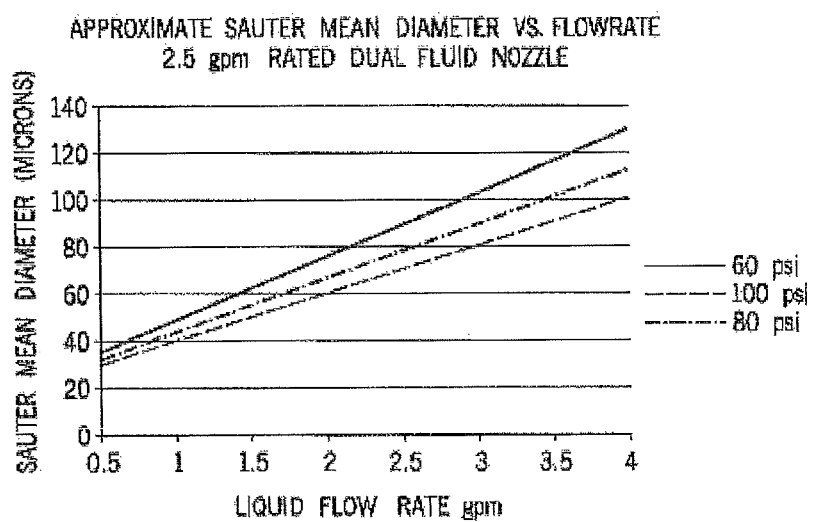
FIG. 29 depicts spray characteristics for the dual fluid nozzle.

FIG. 29 of the drawings plots the relationship of pressure, flow rate, and Sauter mean diameter for the nozzle. In one embodiment, a Sauter mean diameter of less than 120 μm is selected. In distinct related embodiments. Sauter mean diameters of less than 80 μm and 30 μm are selected.

Example 21

Ammonium Bisulfate Reduction

The condensation of ammonium bisulfate results in a sticky material that can cause ash buildup and fouling problems. When HBr injection is used in conjunction with a SCR, SNCR, or similar technologies that introduce ammonia into the flue gas stream and produce ammonia slip, which is unreacted ammonia, HBr dosing is effective at reducing the formation of ammonium bisulfate. Ammonium bisulfate is produced when ammonia is introduced into the flue gas and reacts with sulfur compounds, primarily sulfuric acid. If a system produces more than 2 ppmv of ammonia slip, substantial deposits of ammonium-bisulfate can accumulate, particularly in the downstream air preheater and/or ESP. The melting point of ammonium bisulfate is 297 degrees Fahrenheit (° F.), which can exist at the bottom of an air preheater and equipment downstream of the air preheater. During HBr injection, the ammonia slip is converted to a species other than ammonium bisulfate that does not have the same tendency to accumulate on duet and air pollution control equipment surfaces. Not wishing to be bound by theory, a probable alternative compound is ammonium bromide. The mechanism of reactions within a flue gas are complex, however, ammonia may react with hydrogen bromide to form ammonium bromide by the following reaction.

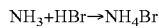

$$NH_3 + HBr \rightarrow NH_4Br$$

Ammonium bromide, which melts at 846° F., and/or other compounds that are the product of HBr injection in systems that have ammonia slip appeared to be leaving the system as solid particulate that can be effectively removed from the gas stream using standard pollution control equipment. Thus, at typical flue gas temperatures downstream of a SCR ash having increased nitrogen or ammonia content can be collected in air pollution control equipment with other particulate matter.

An example of this effect is shown in the testing of a pulverized bituminous coal fired power plant with a capacity of 325 MW. Nitrons oxides ($NO_x$) were controlled using low $NO_x$ burners and a selective catalytic reduction system. A cold-side electrostatic precipitator was used to control particulate matter, and a wet flue-gas desulfurization system was used to control sulfur dioxide. In the present example, HBr dosing occurred downstream of the SCR. Throughout the testing of the present example, all downstream solid samples collected (fly ash, FGD slurry) were also analyzed for ammonia content. The results of this analysis are summarized in Table 7. It was observed that the ash collected in the ESP during HBr injection contained between 1.4 and 3.5 times the ammonia present during baseline testing, with a consistent ammonia injection rate over the test program. The results indicate that during HBr dosing the ammonia was being converted to a chemical species that was not collecting in the system upstream of the baghouse, and was being effectively removed in the ash. As used herein, "total ammonia" represents the results from a test that measures the amount of ammonia released into the headspace of a sample container when the ash is slurried in a 50% solution by weight of sodium hydroxide. Once the ammonia released into the headspace is quantified, that value is used to determine "total ammonia" as (mg NH3/kg ash),

TABLE 7

| Date  | Time | HBr (ppmvd) | $NH_3$ Injection Rate (lb/hr) | Ash Weight (g) | Total $NH_3$ In Ash (mg/kg) | Slurry Cake Weight (g) | Total $NH_3$ InSlurry (mg/kg) |
|---|---|---|---|---|---|---|---|
| Day 1 | AM | 0.0 | 395 | 7.24 | 28 | 26.45 | 3.71 |
| Day 1 | PM | 5.2 | 405 | 8.26 | 91 | 26.15 | 3.39 |
| Day 2 | AM | 1.2 | 480 | 7.71 | 94 | 27.77 | 3.43 |
| Day 2 | PM | 3.0 | 470 | 7.53 | 40 | 26.79 | 3.48 |
| Day 3 | AM | 2.7 | 471 | 8.49 | 97 | 26.76 | 3.13 |

In a related embodiment, HBr and ammonia are injected into the flue gas at separate points where the flue gas is above 297° C. and ash having greater than 30 mg/kg total ammonia is removed from that flue gas. In a further related embodiment, HBr is co-injected with ammonia into a coal-fired flue gas and ash having an ammonium bromide content of at least 30 mg/kg ash is removed from that flue gas.

Example 22

Duct Perspective View

Figure 30:
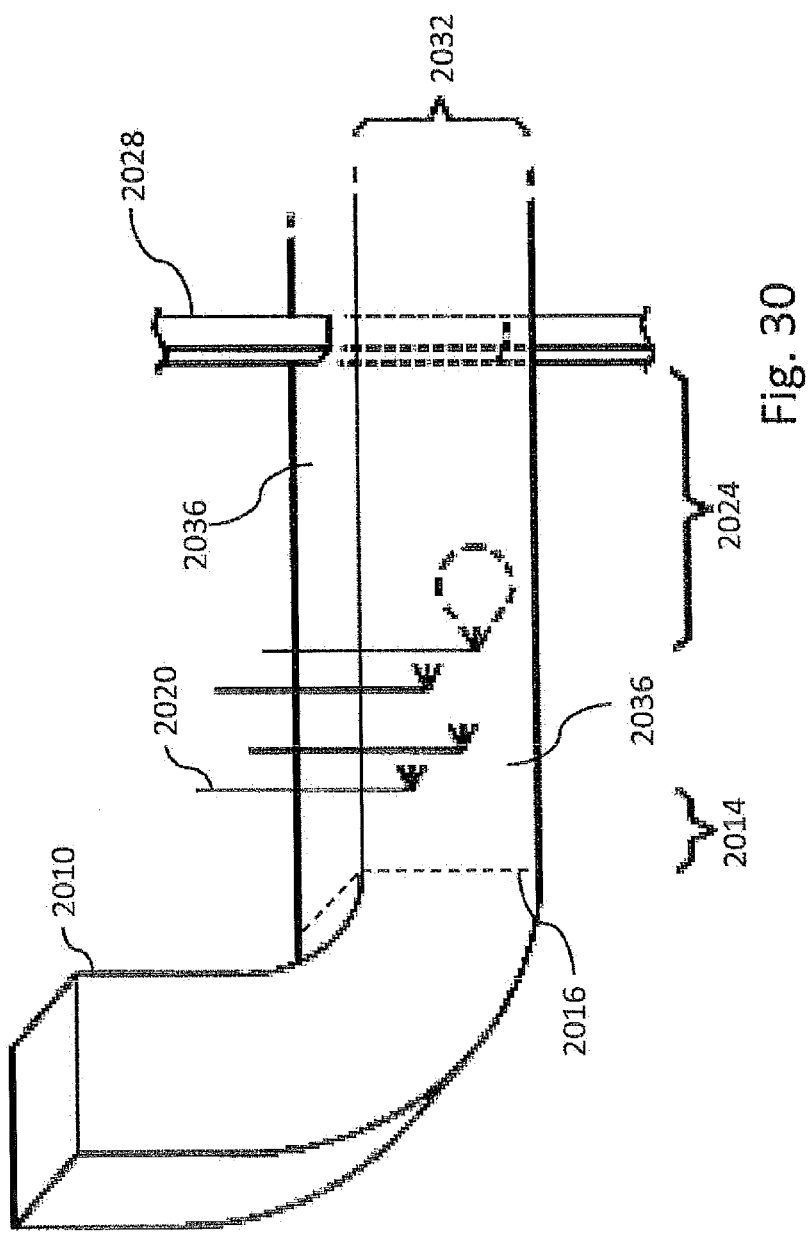
FIG. 30 is a perspective view of a duct into which HBr is being injected.

Referring now to FIG. 30, nozzles may be positioned within fine gas duct 2010 at a distance 2014 sufficiently far from a substantial geometric change 2016 in flue gas duct 2010 to allow tor a reasonable distribution of flow across the cross-section of flue gas duct 2010. Placement of injection nozzles 2020 is at a downstream distance 2024 that is sufficiently large to allow for vaporization of the injected fluid prior to the injected fluid reaching an internal obstruction 2028 with placement of injection nozzles further being far enough from duct walls 2036 to avoid any substantial liquid impingement on duct walls 2036 from the injected HBr. Specific nozzle placement is based on criteria including temperature, spray distribution, flow path, disturbances, and evaporation. In certain embodiments, injection of HBr takes place at a temperature below 900° F. but greater than 400° F. Not wishing to be bound by theory, within this temperature range the reaction kinetics arc of suitable duration to achieve substantial reactions with HBr, and rapid evaporation of the HBr solution. The determination of residence time necessary for proper nozzle placement is installation specific, based primarily on flow velocity, gas temperature, and turbulence. In a typical power plant application, less than 1 second is typically required to achieve evaporation and substantial reaction of the HBr with the Hg. In certain embodiments injection may be configured to have an evaporation time of less than 0.5 seconds. Based on computational fluid dynamics modeling using air atomization with a nozzle designed to achieve 120 micron particle size, evaporation is achieved at a distance of 4.4 feet from the injection nozzle at a duct temperature of 616° F., and at a flue gas flow rate of 587 feet per minute (0.43 seconds for evaporation). Total residence gas times before the first air pollution control device is typically at least 3 to 10 seconds. Injection nozzles 2020 are further positioned to allow for substantial distribution of the fluid within the duct cross section 2032 without substantial contact of liquid with duct walls 2036.

Figure 31:
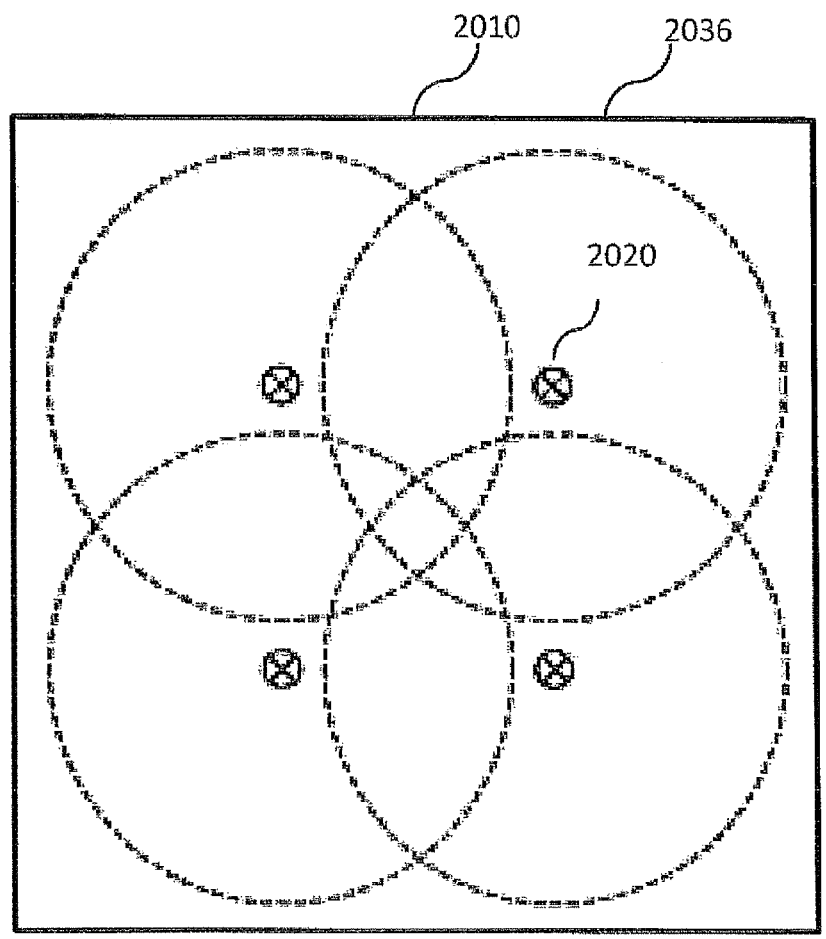
FIG. 31 is a cross-section of a duct in the area of injection.

Referring now to FIG. 31, four injection nozzles 2020 are positioned within flue gas duct 2010 such that injection nozzles 2020 are able to distribute liquid across a substantial majority of duct cross section 2032 without causing large quantities of that liquid to come into contact with duct walls 2036. Dashed lines in FIG. 31 indicate the perimeter of the spray pattern for each injection nozzle 2020 within which the vast majority of liquid droplets originating from the injection nozzles 2020 are vaporized. Nozzle configurations of the present embodiment inject the HBr into the flow stream. Injection of HBr may be co-current injection to avoid potential nozzle pluggage issues that may arise with countercurrent injection. Spray patterns may be selected to maximize the coverage of droplets across the cross-section of the duct. The size of particles being injected is selected such that the droplet size causes quick evaporation into the gas stream to avoid liquid impingement on surfaces and to maximize the residence time of the HBr in vapor form. Due to flow variations across a duct, the delivery of spray into a duct may not be uniform across its cross section. Placement and spacing may be selected to provide suitable residence time for the droplets to evaporate and for the HBr to react with the Hg in the duct stream.

Figure 32:
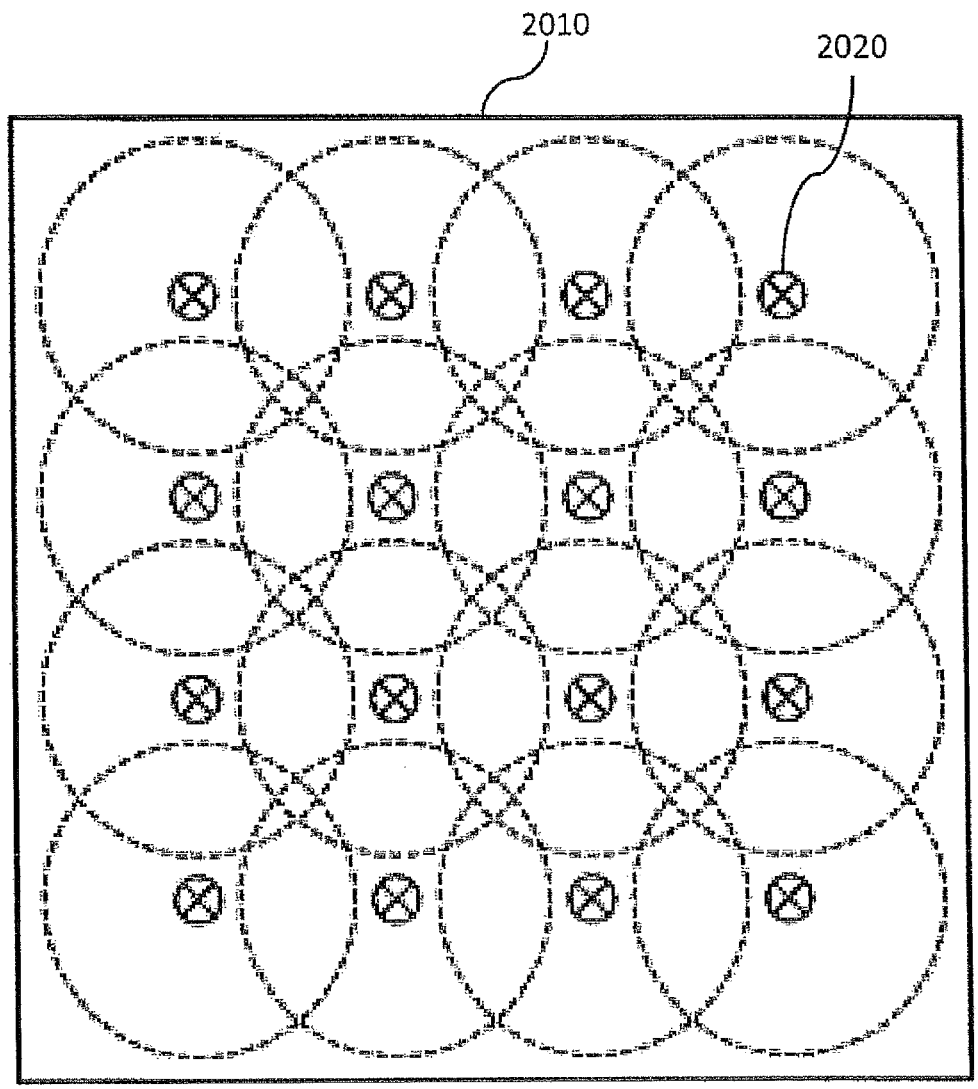
FIG. 32 is a cross-section of a duct in the area of injection.

FIG. 32 represents a configuration similar to that shown in FIG. 31 in which an injection grid of 16 injection nozzles 2020 are used to distribute injection fluid throughout duct cross section 2032.

Figure 33:
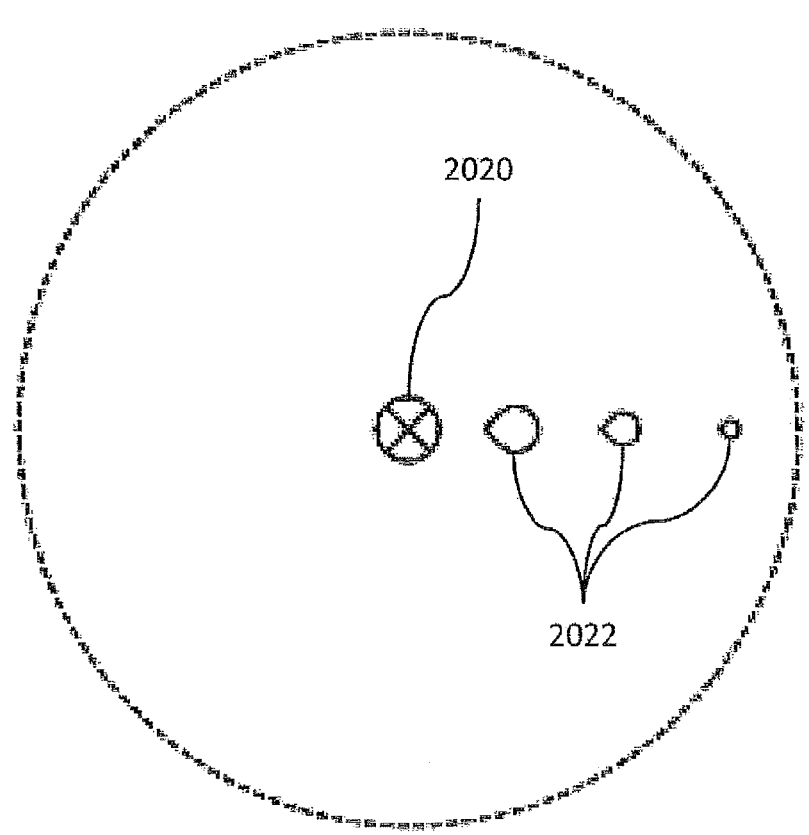
FIG. 33 is a cross-section of a spray pattern with exaggerated droplet characteristics.

FIG. 33 shows the propagation of a droplet as it moves from an injection nozzle 2020 toward the above referenced perimeter. The droplet 2022 is continuously vaporized as it approaches the perimeter and is completely vaporized before reaching the perimeter. Selection of nozzle type and operating pressure may be done to maximize the coverage of a duct by the area within the perimeter without allowing the perimeter to intersect any walls of the duct.

Example 23

By way of example, various injection rates would have different potential concentrations of HBr in the ash for different HBr injection rates because ash content varies across differing types of coal. Table 8 indicates prophetic calculations of HBr ash concentration for various injection rates and ashes.

TABLE 8

| Dose Rate | 1 ppmvd | 6 ppmvd | 60 ppmvd |
|---|---|---|---|
| High fly ash lignite | 67 ppm wt | 400 ppm wt | 4000 ppm wt |
| Low fly ash lignite | 117 ppm wt | 701 ppm wt | 7008 ppm wt |
| PRB | 292 ppm wt | 1750 ppm wt | 17500 ppm wt |

Example 24

Fly Ash Preparation

Fly ash obtained flora a coal fired boiler burning lignite coal was used for the purpose of coating fly ash with Hg and HBr, simulating ash within a line gas stream or on a flue gas duct inner surface. 30 micrograms of HBr was first applied to sorbent module 1605 containing approximately 200 grams of fly ash, followed by 30 ug of Hg.

Figure 34:
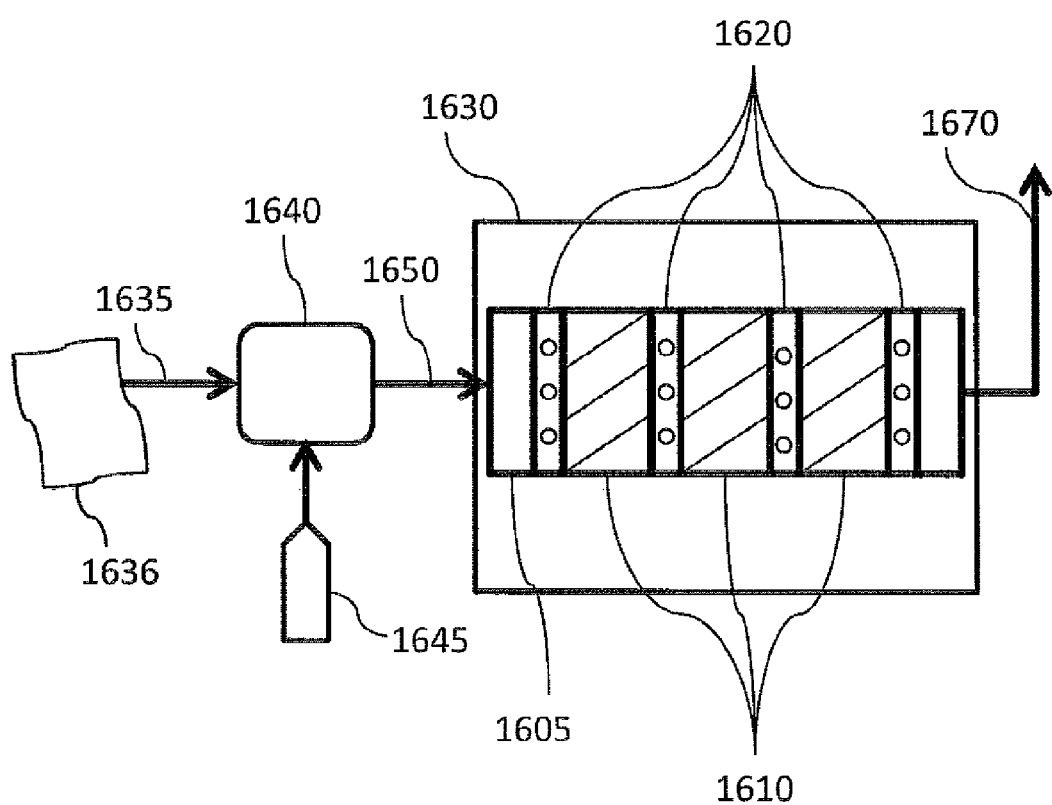
FIG. 34 represents an experimental apparatus for loading fly ash with mercury and HBr.

Referring now to FIG. 34, the experimental apparatus included sorbent module 1605, approximately 1.5 inch diameter by 4 inches long. Ash layers 1610 were separated by glass wool layers 1620, with sorbent module 1605 enclosed in heater 1630 to maintain a temperature of 400° F. A mixture of HBr in air was introduced from a gas handling bag 1636 through glass tubing 1635, heater 1630, glass tubing 1650 and into sorbent module 1605, with motive force provided by a vacuum pump connected to system vent line 1670. Heater 1640 was controlled to a temperature of 400° F. Subsequent to introducing HBr, Hg in an air mixture was introduced from gas handling bag 1636, traveling through glass tubing 1635, heater 1630, glass tubing 1650, and into sorbent module 1605. During the addition of both HBr and Hg, water was injected into heater 1640 using syringe pump 1645 to create gas stream 1650 with a moisture content of 7 percent.

Example 25

Organohalogens

Figure 35:
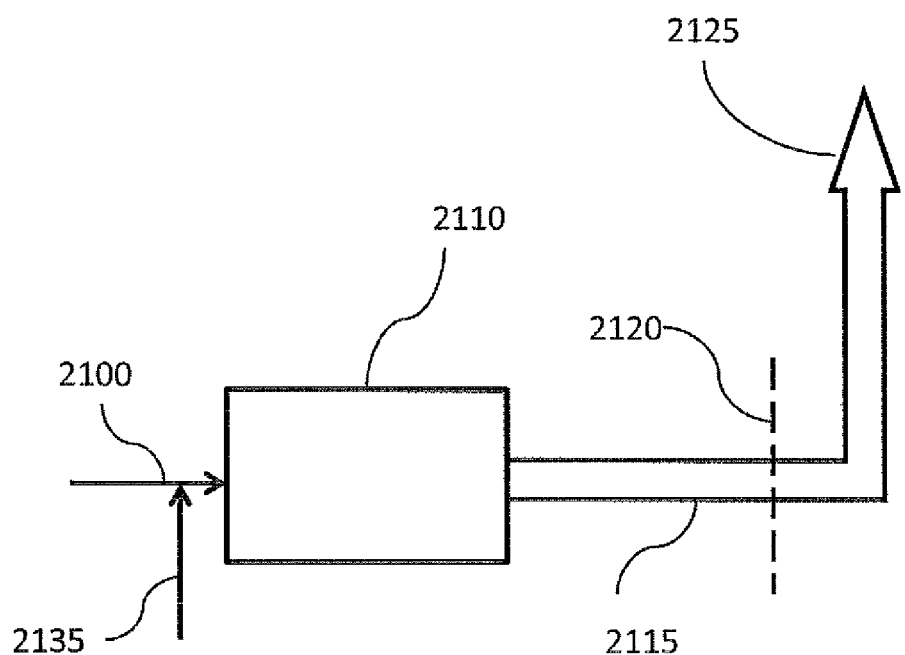
FIG. 35 is a configuration in which organohalogens may be combusted for the treatment of flue gas.

In a prophetic example, an organohalogen is combusted such that the combustion products come into intimate contact with a combustion exhaust containing mercury. Referring now to FIG. 35, reagents 2100 are introduced into burner 2110 to create an exhaust containing mercury which enters exhaust conduit 2115. Organohalogen supply line 2135 provides organohalogen in a manner that causes mixing with the reagents. In one embodiment of the present example, reagents 2100 comprise coal and combustion air and organohalogen supply line 2135 supplies organohalogen that is mixed with the coal prior to entering burner 2110. Exhaust in exhaust conduit 2115 cools to below 500° C. at transition point 2120. The organohalogen may be ethylbromide or bromoform. Exhaust conduit 2115 should be configured to have sufficient residence time and mixing to promote the formation of HBr. Injection of treatment gas 2140 may be by direct injection or through a series of injection tubes such that adequate mixing occurs allowing for sufficient contact of the HBr with the flue gas stream in exhaust conduit 2115. At the end of exhaust conduit 2115, the exhaust is discharged into the atmosphere at stack 2125. In an alternate embodiment, dibromomethane is the organohalogen that is combusted. In a further alternate embodiment, dibromoethane is the organohalogen that is combusted. In a still further alternate embodiment, ethylene dibromide is the organohalogen that is combusted. In a series of separate but related embodiments, any one of the compounds of FIGS. 38A-38E may be used as the organohalogen that is combusted.

Brominated organohalogens used in the present example may have one or more of the following characteristics: low toxicity, not being classified as a known carcinogen, containing carbon, having greater than 50% bromine by weight, and being liquid at standard temperature and pressure.

Equipment used to effect the chemical reaction of the organohalogen may be a thermal oxidizer, a chemical reaction vessel, or a similar devices. In one embodiment, pyrolysis or combustion of the organohalogen takes place at a temperature above 1650° F.

Example 26

Organohalogens

Figure 36:
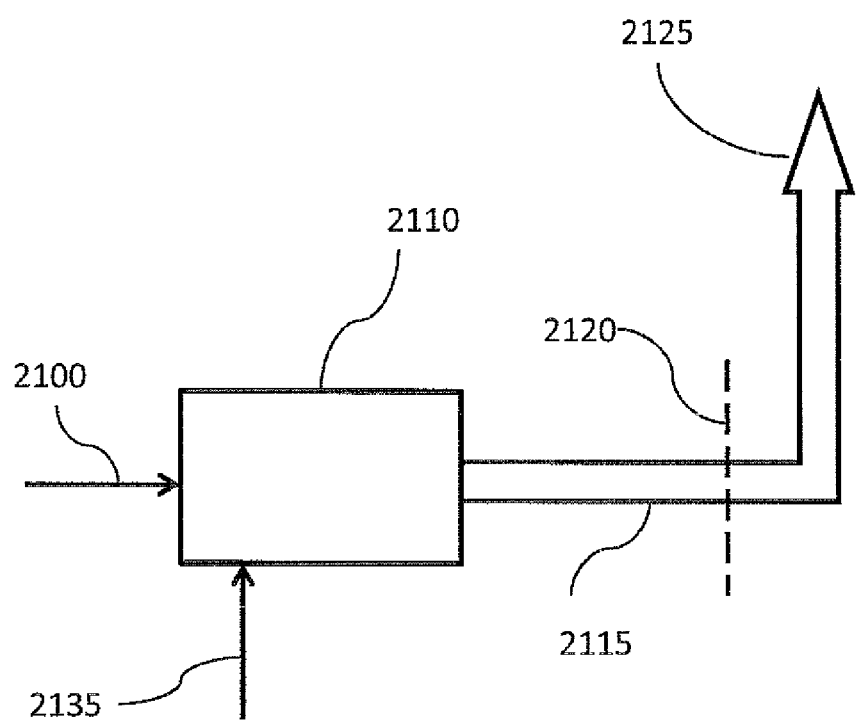
FIG. 36 is a configuration in which organohalogens may be combusted for the treatment of flue gas.

Referring now to FIG. 36, the present example has features and characteristics equivalent to those of Example 25 with the exception that organohalogen supply line 3135 injects organohalogen directly into burner 2110.

Example 27

Organohalogens

Figure 37:
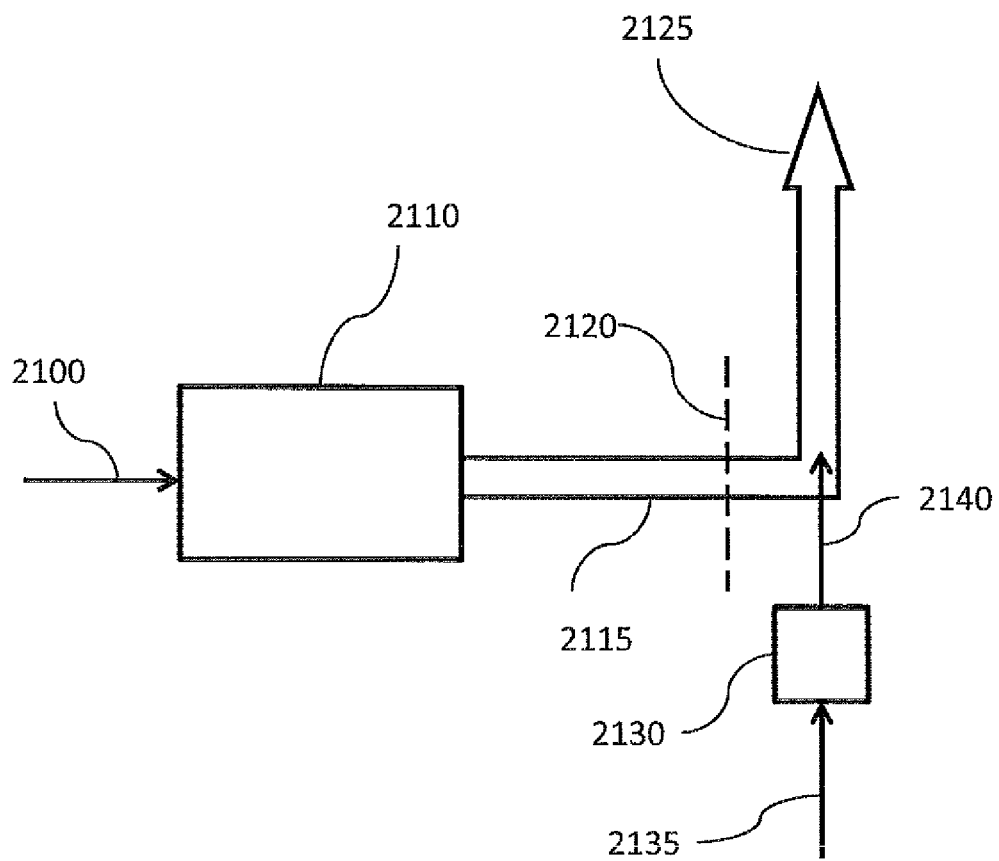
FIG. 37 is a configuration in which organohalogens may be combusted for the treatment of flue gas.

Referring now to FIG. 37, the present example has features and characteristics equivalent to those of Example 25 with the following exceptions. Treatment gas 2140 is added to exhaust conduit 2115 after transition point 2120. An organohalogen introduced at organohalogen supply line 2135 is combusted in standalone burner 2130, rather than being introduced with reagents 2100, to produce treatment gas 2140. The configuration of standalone burner 2130 relative to exhaust conduit 2115 should be such that it promotes the formation of HBr through sufficient residence time. Injection of treatment gas 2140 may be by direct injection or through a series of injection tubes such that adequate mixing occurs allowing for sufficient contact of the HBr with the flue gas stream in exhaust conduit 2115.

Example 28

In a prophetic example, flue gas desulfurization (FGD) is carried out by one of several known wet scrubbing techniques (including but not limited to inhibited oxidation, forced oxidation, limestone, and lime based systems). Under these circumstances, HBr injection is carried out prior to the wet FGD allowing for enough residence time to sufficiently convert Hg(0) into Hg(II) to meet applicable pollution control standards.

Example 29

Low Temperature Oxidation

Certain applications, such as post-process treatment of cement kiln flue gases, would require introduction of the HBr solution at temperatures well below those seen in coal-fired power plants. Mercury emissions from cement kilns are often significantly higher than coal-fired plants due to native mercury in the limestone feed materials. A series of tests were conducted to evaluate the effectiveness of HBr to oxidize elemental mercury at temperatures ranging from 150 to 250° F.

Mercury vapor was generated by passing filtered and decontaminated ambient air at a controlled flow rate over a small amount of elemental mercury to create concentrations of mercury (1 to 20 µg/m$^3$) in the gas stream. Inlet mercury concentrations (pre-HBr injection) were monitored with a vapor mercury analyzer (Jerome 431X). The gas stream was heated and maintained at temperatures ranging from 100 to 250°0 F. Once heated, HBr vapor was introduced into the gas stream to initiate the oxidation process of the elemental mercury. Controlled vaporization of HBr solution was facilitated by injecting HBr solution into a heated chamber at a predetermined flow rate and flashing the liquid into a small purge flow. The vaporized HBr was diluted with dry air to prevent condensation of the HBr. A mixer downstream of the HBr vaporizer supplied with dilution air mixed the dilute Hg gas stream to facilitate the reaction between HBr and elemental mercury. The mixed Hg/HBr stream was passed through a tube reactor for limited added retention time. After the tube furnace, the gas stream was bubbled through a glass impinger of potassium chloride (KCl) where the oxidized mercury was removed. Finally, a second vapor mercury analyzer (Jerome 431X) was used to monitor the elemental mercury concentrations of the gas stream, prior to exiting the system and going into the hood.

Test conditions included run times of 30 to 60 minutes and ambient air as the feed gas at feed rates of 0.1 to 1 scfm between 100 to 250° F. Gas stream mercury concentrations ranged from 1 to 100 µg/m$^3$ HBr solution concentrations ranged from 0.1 to 3.0%. HBr solution flew rates ranged from 0.01-3.0 mL/hr creating gas stream HBr concentrations from 1 to 25 ppmvd. The impinger solution was an aqueous 1N KCl solution.

Results for a typical test run included a run time of 2 hours, a gas stream flow rate of 3.3 liter/min, a reactor internal temperature of 125° C., a gas stream HBr concentration of 3.8 ppmvd at times when 0.8 ml/hr of 0.28% HBr solution was added.

Table 9 below gives results of a typical run. The desired effect from the HBr addition increases over a few minutes at the start, then levels off at about 85% for this particular set of conditions.

TABLE 9

Results of HBr Treatment of Mercury in Effluent Gas

| Time[1] (min.) | Hg Concentration at Inlet (µg/cu meter) | Hg Concentration at Outlet (µg/cu meter) | Percent Hg Removal |
|---|---|---|---|
| Start | 40 | 25 | 37.5 |
| 5 | 40 | 25 | 37.5 |
| 15 | 40 | 20 | 50 |
| 25 | 40 | 12 | 70 |
| 45 | 40 | 6 | 85 |
| 60 | 40 | 5 | 88 |
| 75 | 40 | 6 | 85 |

[1]From Initial Injection of HBr.

Similar experiments confirm that HBr is effective at aggressively oxidizing Hg and allowing collection of the mercury salt by standard methods at temperatures as low as 190° F.

Example 30

In a series of prophetic examples, HBr may be delivered into the flue gas in various forms including, fully vaporized concentrated aqueous HBr, partially vaporized concentrated aqueous HBr, fully vaporized dilute aqueous HBr, and partially vaporized dilute aqueous HBr.

Example 31

In a series of prophetic examples, by varying residence time, mixing conditions, and other process variables, coal may be combusted according to the methods described herein such that a halogen containing additive reacts with the mercury from the coal and, on a weight basis, the halogen containing additive is supplied at 300 ppmvd or less of the total of coal and additive supplied and less than 50 weight percent of the mercury in the coal is released to the atmosphere. In related embodiments, the additive is supplied at 250 ppmvd or less, 300 ppmvd or less, 150 ppmvd or less, and 100 ppmvd or less. Conversion rates in these embodiments may be such that less than 20 weight percent of the mercury in the coal is released to the atmosphere and in some embodiments less than 10 or even 5 weight percent of the mercury in the coal is released to the atmosphere. Not wishing to be bound by theory, HBr on a weight basis may have mercury removal capabilities that greatly exceed those of calcium bromide due to multiple factors. First, the molecular weight of HBr is lower than that of calcium bromide. Second, because HBr may be applied after combustion rather than prior to combustion, a greater quantity of HBr may be available for reaction with mercury. Finally, reaction chemistry and other interactions in the flue gas may favor HBr as a reactant.

Example 32

Calcining

Figure 39:
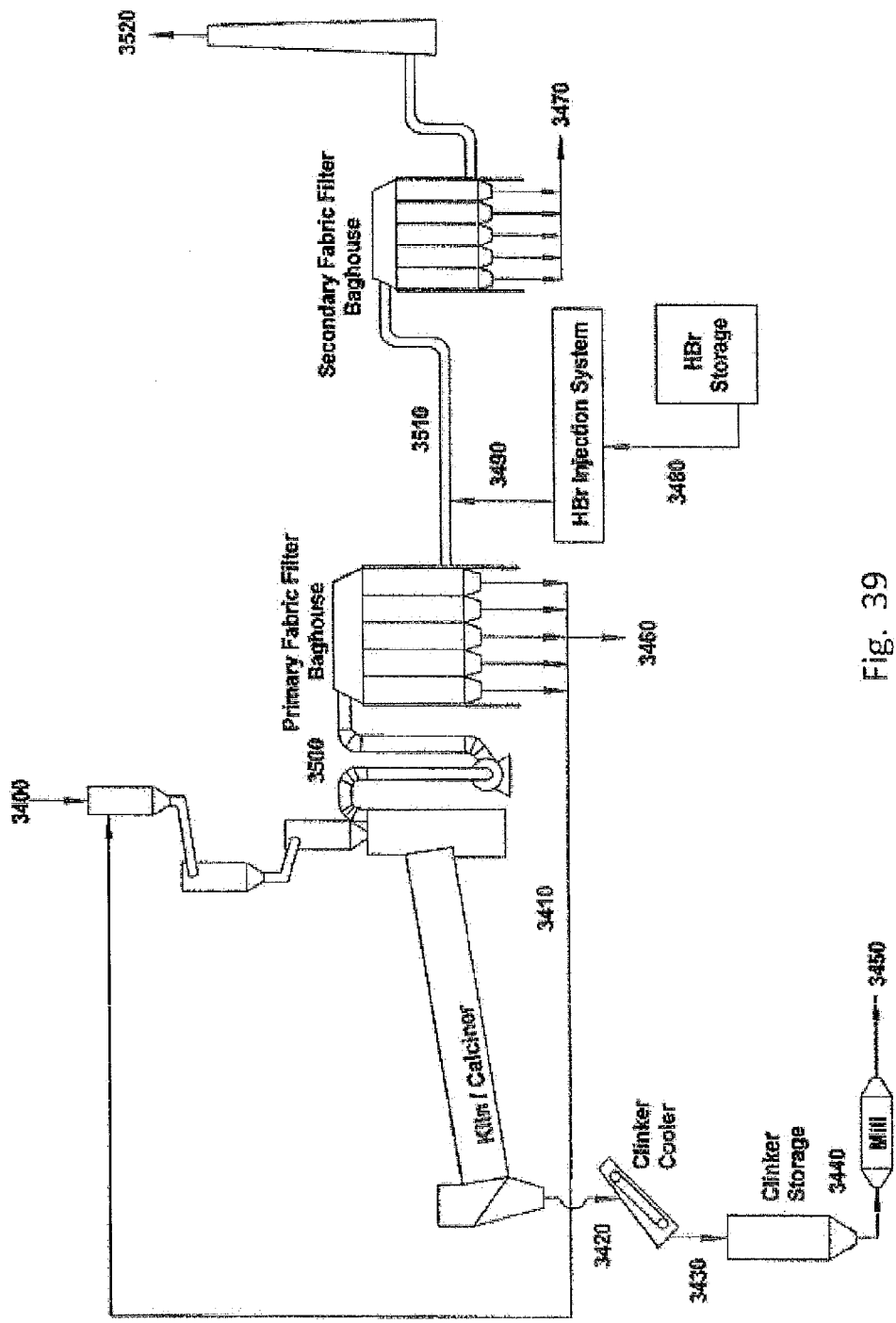
FIG. 39 depicts a calcining process with an HBr injection system.

In a prophetic example, one or more of the techniques described herein may be utilized to remove mercury from the exhaust of a calcining process, such as the calcining process of cement production. An example calcining application is presented in Figure U. In this example, HBr is applied in conjunction with or without PAC injected in a transition duct between the primary and secondary fabric filter baghouse. HBr mixes with the flue gas, oxidizing the mercury, which is then adsorbed onto the PAC or, in the absence of PAC, the treated HBr-impregnated fly ash. The fly ash and/or PAC is then collected by the Secondary Fabric Filter Baghouse (SFFB). As shown in FIG. 39, raw materials, (limestone, coal, minerals for cement production) are introduced into the system as process stream 3400. The raw materials are conveyed to the Kiln/Calciner where oxidation and calcination occurs. Mercury and other volatile elements and compounds are evolved into the flue gas stream 3500 and conveyed through various process steps to a Primary Fabric Filter Baghouse (PFFB). Ash collected in the Primary Baghouse, which can be sold as a byproduct of the process, exits the system as stream 3460, or is recycled back to the front of the process as stream 3410. Because a large fraction of the ash is recycled back to the front of the process, mercury collection in the PFFB is unproductive and discouraged, as it would tend to increase the equilibrium concentration of mercury and other contaminates in the filial product moving to the clinker cooler as stream 3420. The final product is cooled, milled and shipped, exiting the process as stream 3450. The gas stream is cooled somewhat by passing through the PFFB in route to the SFFB. The flue gas is treated to oxidize and remove mercury in the transition between the PFFB and the SFFB, stream 3510. HBr is pumped from storage via stream 3480 into the HBr Injection System, described in detail elsewhere in this document. The HBr is then injected under pressure through stream 3490 into the transition duct 3510, where the HBr evaporates and reacts with elemental mercury. A significant portion of the HBr not reacted directly with the mercury proceeds to the SFFB where it associates with the ash to form a reactive layer of material cake on the surface of the fabric filters. Most of the remaining elemental mercury is oxidized and collected within the filter cake. Mercury already in an oxidized form is removed by the filter cake. The cleaned flue gas exits the system as stream 3520 and is released to the atmosphere. The mercury-laden ash exits the system as stream 3470 and can be sent to reclaim metals, including mercury, or conveyed to the appropriate disposal site.

As described in the test associated with Example 29, essentially complete oxidation of elemental mercury can be achieved at 190° F., given that no moisture is condensed on contacted surfaces.

Example 33

Ore Roasting

In a prophetic embodiment, one or more of the techniques described herein may be utilized to remove mercury from the exhaust gas of an ore roaster such as the ore roasters associated with gold mining.

Example 34

Coke Ovens

Figure 40:
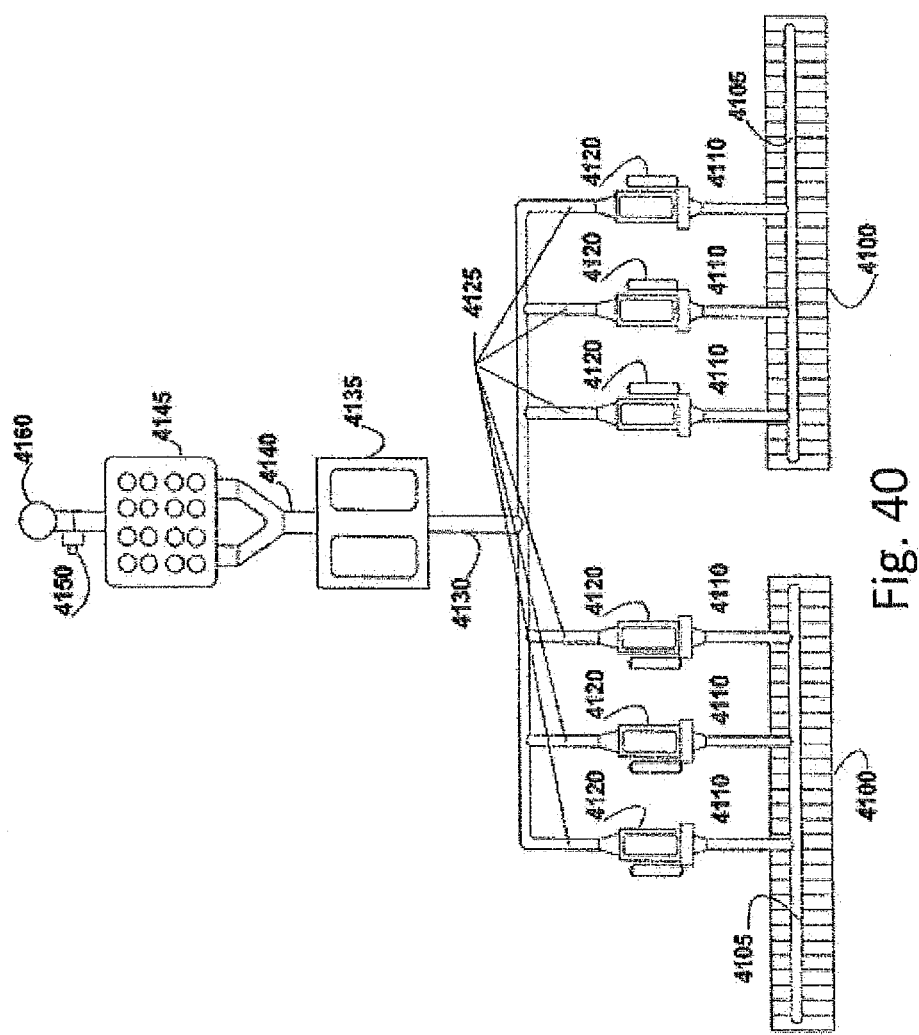
FIG. 40 depicts a pollution control system for coke ovens with HBr injection.

In a prophetic example, one or more of the techniques described herein may be utilized to oxidize and remove mercury from coke oven exhaust. The U.S. EPA has stipulated that non-recovery type coke ovens are designated as the Maximum Achievable Control Technology for coking operations. This example addresses the use of the above described HBr mercury control technologies on such a system. In a non-recovery coke oven, coke is produced by heating coal in an enclosed oven while maintaining a chemically reducing environment in and around the coal bed. FIG. 40 shows an example of one possible production plant configuration in which HBr injection is utilized. In this application, multiple coke ovens are constructed side by side to create two banks of 30 ovens. In practice, the number of ovens can vary, but banks of 25 to 50 ovens are typical. Multiple batteries of ovens are combined to yield plant sites with over 200 ovens. Up to 30 tons of coal is introduced into each of the ovens 4100 and maintained at temperatures of over 2000° F. for 24 to 48 hours, until all volatile matter is evolved and only fixed carbon and trace minerals remain. The hot exhaust gases are ducted from the ovens to a "common tunnel" 4105 that runs the length of each bank. The common tunnel collects and conveys the gases through high temperature ducting 4110 to any of multiple Heat Recovery Steam Generators 4120, where waste heat from the process is used for co-generation. After heat is removed, the exhaust gases are conveyed through ducting to a manifold 4130 where the gases are remixed into a single duct. The collected gas passes through a spray dryer absorber 4135 where sulfur dioxide is removed. The gases then pass through ducting 4140 to a fabric filter baghouse 4145 for particulate removal and through the induced draft fan 4150 and to a common stack 4160 into tire atmosphere.

Mercury is emitted from the system through direct evolution of elemental mercury (which occurs naturally in the coal) into the exhaust gases. Some of the native mercury may already be in an oxidized form. This mercury is thermally decomposed and emitted as elemental mercury. The mercury emissions can be controlled by introducing HBr at location(s) 4125 upstream of the spray dryer absorber. The mercury will be oxidized and can be collected in the spray dryer or downstream in the fabric filter baghouse. Powdered activated carbon may be injected upstream of the fabric filter baghouse, if required to achieve site-specific mercury emission removals.

Viewing the above practiced embodiments together, the ratio of surface area to scfm of gas being treated appears to be an important metric for the performance of the HBr treatment. As used herein, the term "treatment area to floe gas flow ratio" should be calculated as follows:

$$\text{treatment area to flue gas flow ratio} = \frac{\text{Surface area covered by conditioned ash sorbent (ft}^2\text{)}}{\text{Standard cubic feet per minute of flue gas treated (ft}^3\text{/min)}}$$

As used herein, the term "effective quantity" designates a quantity of a compound sufficient to bring a flue gas not otherwise compliant with a mercury pollution control standard into compliance with the mercury pollution control standard. As used herein, the term "mercury contaminated gas" designates a gas having a mercury content of at least 0.5 µg/m$^3$ at standard conditions. As used herein, the term "dilute aqueous HBr" designates an aqueous HBr solution having 30% HBr or less. As used herein, the term "concentrated aqueous HBr" designates an aqueous HBr solution having more than 30% HBr. As that phrase is used herein, "HBr susceptible materials" designates materials that would degrade in a way that would make them not useful for their intended purpose after a 12 month exposure to a 5.0% solution of HBr at 200° F. As that term is used herein in the context of HBr contacting various surfaces, "substantial accumulation" designates an accumulation of HBr sufficient to degrade the surface in a way that would require replacement of the surface if the accumulation were present for a year. As that term is used herein, "native particulate matter" represents particulate matter that originates with the gas stream being treated as opposed to being injected into a gas stream as a reagent or additive. An example of native particulate matter is native fly ash entrained in a flue gas from the burning of coal. As that phrase is used herein, "doped particulate matter" designates particulate matter having an active bromine content greater than 20 ppm by weight. Ratios and concentrations described herein are by weight unless there is an indication to the contrary. As that term is used herein, "media" designates an intervening substance capable of substantially changing the composition of the gas with which it interacts. Examples of media as that term is used herein would include scrubber liquid, powdered activated carbon, ash, and fabric filters. In the context of burning an organohalogen, a substantial quantity of any particular organohalogen is a quantity of that organohalogen sufficient to decrease the quantity of mercury in the form of elemental mercury (Hg(0)) by 10% in a flue gas that is being treated as compared to the quantity of mercury in the form of elemental mercury that would be present in the flue gas if the particular organohalogen was never introduced. As that phrase is used herein, "organically bound bromine" represents bromine atoms that are directly bound to a carbon atom in the relevant molecule.

There are, of course, other alternate embodiments which are obvious from the foregoing descriptions of the invention, which are intended to be included within the scope of the invention, as defined by the following claims.

The invention claimed is:

1. A method of treating mercury contaminated gas comprising:
   a. introducing a dilute aqueous hydrogen halide comprising 0.25 to 4% hydrogen halide selected from HBr and HI into a mercury contaminated gas stream containing a quantity of particulate matter at an introduction rate sufficient to create a concentration of at least 0.1 ppmvd;
   b. wherein greater than 50% of all particulate matter in the mercury contaminated gas stream is a native particulate matter;
   c. contacting a quantity of active halide with the native particulate matter;
   d. creating a doped particulate matter;
   e. coating a filtration media with the doped particulate matter; and
   f. passing a portion of the mercury contaminated gas stream through the doped particulate matter on the filtration media.

2. The method of claim 1 wherein the hydrogen halide is HBr.

3. The method of claim 1 wherein the introducing of a hydrogen halide selected from HBr and HI occurs at a point where the mercury contaminated gas stream is less than 750° F.

4. The method of claim 1 wherein the introducing of a hydrogen halide selected from HBr and HI occurs at a point where the mercury contaminated gas stream is greater than 180° F.

5. The method of claim 1 wherein the mercury contaminated gas stream is a byproduct of the combustion of coal having a chlorine content of less than 300 ppm by weight and a mercury content greater than 50 ppb by weight.

6. The method of claim 1 wherein the introducing of a hydrogen halide selected from HBr and HI is at an introduction rate creating a concentration of at most 15 ppmvd.

7. A method of treating mercury contaminated gas comprising:
   a. introducing a mercury contaminated gas into a conduit;
   b. wherein the conduit comprises HBr susceptible materials;
   c. wherein the mercury contaminated gas has an initial quantity of mercury;
   d. wherein the conduit has an inner surface;
   e. injecting a quantity of dilute aqueous HBr comprising 0.25 to 4% into the conduit;
   f. wherein the injection of the quantity of dilute aqueous HBr is through a plurality of nozzles at an HBr injection rate sufficient to create a HBr concentration of at least 0.1 ppmvd;
   g. wherein a spray pattern of the plurality of nozzles covers a majority of a cross-section of the conduit;
   h. wherein there is no substantial accumulation of aqueous HBr on the inner surface; and
   i. contacting the mercury contaminated gas with a media thereby removing at least 50% of the initial quantity of mercury from the mercury contaminated gas.

8. The method of claim 7 wherein the injection of the quantity of dilute aqueous HBr occurs at a point where the mercury contaminated gas is between 180° F. and 750° F.

9. The method of claim 7 wherein the plurality of nozzles is a plurality of dual fluid nozzles and the quantity of dilute aqueous HBr has an HBr concentration greater than 0.25%.

10. The method of claim 7 wherein the injection of the quantity of dilute aqueous HBr is through a plurality of nozzles at an HBr injection rate creating a HBr concentration of at most 10 ppmvd.

11. A method of treating mercury contaminated gas comprising:
   a. introducing active bromine into a treatment zone wherein the active bromine comprises a dilute aqueous HBr solution comprising 0.25 to 4% HBr;
   b. passing a mercury contaminated gas through the treatment zone;
   c. wherein the mercury contaminated gas contains nitrogen;
   d. wherein a residence time of the active bromine in the treatment zone is at least 1.1 times that of a residence time of the nitrogen in the treatment zone; and
   e. removing at least 50% of the mercury contained in the mercury contaminated gas stream from the mercury contaminated gas stream with a particulate control device.

12. The method of claim 11 wherein the introducing active bromine into the treatment zone is at an introduction rate that creates an active bromine concentration of between 0.1 ppmvd and 10 ppmvd.

* * * * *